United States Patent
Sharma

(10) Patent No.: US 12,301,757 B2
(45) Date of Patent: *May 13, 2025

(54) METHODS, APPARATUSES, AND SYSTEMS FOR DYNAMICALLY NAVIGATING INTERACTIVE COMMUNICATION SYSTEMS

(71) Applicant: Paymentus Corporation, Charlotte, NC (US)

(72) Inventor: Dushyant Sharma, Waxhaw, NC (US)

(73) Assignee: PAYMENTUS CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,313

(22) Filed: Jan. 11, 2024

(65) Prior Publication Data

US 2024/0146844 A1    May 2, 2024

Related U.S. Application Data

(63) Continuation of application No. 17/660,661, filed on Apr. 26, 2022, now Pat. No. 11,909,917, which is a
(Continued)

(51) Int. Cl.
*H04M 3/493*  (2006.01)
*G06Q 30/04*  (2012.01)
(Continued)

(52) U.S. Cl.
CPC .......... *H04M 3/5166* (2013.01); *G06Q 30/04* (2013.01); *G10L 15/22* (2013.01); *H04L 65/1069* (2013.01)

(58) Field of Classification Search
CPC ..... A61B 1/0004; G01C 21/3608; G06F 3/16; G06F 3/162; G06F 3/167; G06F 17/18;
(Continued)

(56) References Cited

U.S. PATENT DOCUMENTS 5,742,666 A    4/1998   Alpert
6,151,571 A *  11/2000  Pertrushin ............... G10L 17/26
                                                    704/207
(Continued)

FOREIGN PATENT DOCUMENTS

JP    2018-170664 A    11/2018
JP    2019-057777 A    4/2019
(Continued)

OTHER PUBLICATIONS

U.S. Appl. No. 17/660,661, filed Apr. 26, 2022, U.S. Pat. No. 11,909,917, Issued.
(Continued)

*Primary Examiner* — Gerald Gauthier
(74) *Attorney, Agent, or Firm* — ALSTON & BIRD LLP

(57) ABSTRACT

Methods, apparatuses, and systems are described for dynamically navigating interactive communication systems. An example method may comprise: receiving, from a user device, sound waves or audio information, the sound waves or audio information indicative of a request to initiate an interactive communication session with a communication system of a biller or merchant; interpreting, based on the sound waves or audio information, an intent of the communication session and an identity of the biller or merchant; retrieving a predetermined interaction coding associated with the biller or merchant; and initiating the interactive communication session with the communication system of the biller or merchant based on the predetermined interaction coding.

21 Claims, 7 Drawing Sheets

Related U.S. Application Data continuation of application No. 17/303,529, filed on Jun. 1, 2021, now Pat. No. 11,343,378.

(51) Int. Cl.
- *G10L 15/22* (2006.01)
- *H04L 65/1069* (2022.01)
- *H04M 3/51* (2006.01)

(58) Field of Classification Search
CPC ........ G06F 40/117; G06N 5/04; G06Q 20/02; G06Q 20/14; G06Q 20/363; G06Q 20/401; G06Q 20/4014; G06Q 30/04; G06Q 20/227; G09B 5/06; G10L 15/14; G10L 15/1815; G10L 15/22; G10L 15/30; G10L 15/32; G10L 17/06; G10L 17/18; G10L 17/22; G10L 17/24; G10L 17/26; G10L 19/00; G10L 21/003; G10L 15/063; G10L 15/1822; H04L 12/1827; H04L 43/0811; H04L 65/1069; H04L 65/1096; H04L 51/216; H04L 51/56; H04M 1/72403; H04M 3/42068; H04M 3/4935; H04M 3/4936; H04M 3/5166; H04M 3/5183; H04M 3/42102; H04M 3/493; H04M 3/5235; H04M 7/003; H04M 15/8033; H04N 21/4394; H04R 1/406; H04W 4/21

See application file for complete search history.

(56) References Cited

U.S. PATENT DOCUMENTS

| | | | |
|---|---|---|---|
| 6,456,695 B2 | 9/2002 | Lee | |
| 6,690,774 B1 | 2/2004 | Chang | |
| 7,200,551 B1 | 4/2007 | Senez | |
| 8,311,837 B1* | 11/2012 | Fox | H04M 3/4936 704/270.1 |
| 8,896,436 B1 | 11/2014 | Morehead | |
| 9,762,733 B1 | 9/2017 | Ramanujaiaha | |
| 10,019,713 B1 | 7/2018 | Mcintosh et al. | |
| 10,089,625 B2 | 10/2018 | Anderson et al. | |
| 10,148,816 B2* | 12/2018 | Badger | H04M 3/493 |
| 10,216,281 B2 | 2/2019 | Beatty et al. | |
| 10,354,653 B1 | 7/2019 | Vijayvergia et al. | |
| 10,425,533 B1* | 9/2019 | Mossoba | H04M 7/003 |
| 10,558,956 B2 | 2/2020 | Chen et al. | |
| 10,630,840 B1* | 4/2020 | Karp | H04M 3/5235 |
| 10,656,806 B2 | 5/2020 | Jhawar | |
| 10,742,808 B2* | 8/2020 | Cho | H04M 1/72403 |
| 10,748,125 B2 | 8/2020 | Xing | |
| 10,783,508 B1 | 9/2020 | Bell et al. | |
| 10,956,513 B2 | 3/2021 | Ahmed | |
| 11,051,164 B2* | 6/2021 | Nair | H04M 3/5166 |
| 11,087,353 B2 | 8/2021 | Beatty et al. | |
| 11,206,330 B1* | 12/2021 | Nguyen | H04M 15/8033 |
| 11,252,149 B1 | 2/2022 | Bang | |
| 11,270,279 B1* | 3/2022 | Rozovski | G06Q 20/14 |
| 11,343,378 B1* | 5/2022 | Sharma | H04L 65/1069 |
| 11,423,375 B2* | 8/2022 | Iyer | G06Q 20/4014 |
| 11,494,058 B1* | 11/2022 | Damian | G09B 5/06 |
| 11,651,296 B1 | 5/2023 | Mewhort | |
| 11,741,444 B2* | 8/2023 | Dundigalla | G06Q 20/401 705/38 |
| 11,909,917 B2* | 2/2024 | Sharma | H04M 3/5166 |
| 2002/0095462 A1 | 7/2002 | Beck et al. | |
| 2002/0156570 A1* | 10/2002 | Ohtsuji | G01C 21/3608 340/995.13 |
| 2006/0206425 A1* | 9/2006 | Sharma | G06Q 20/02 705/40 |
| 2006/0224470 A1 | 10/2006 | Garcia et al. | |
| 2006/0235696 A1 | 10/2006 | Bennett | |
| 2007/0127638 A1 | 6/2007 | Doulton | |
| 2009/0055282 A1 | 2/2009 | Ondeck | |
| 2010/0278316 A1* | 11/2010 | Beauregard | H04M 3/42068 379/88.01 |
| 2010/0316213 A1 | 12/2010 | Goel | |
| 2011/0106701 A1 | 5/2011 | Jagannathan et al. | |
| 2011/0258121 A1 | 10/2011 | Kauniskangas et al. | |
| 2012/0232978 A1* | 9/2012 | Steul | H04W 4/21 455/413 |
| 2013/0325481 A1 | 12/2013 | Van Os | |
| 2014/0050307 A1 | 2/2014 | Yuzefovich | |
| 2014/0119531 A1 | 5/2014 | Tuchman | |
| 2014/0309996 A1 | 10/2014 | Zhang | |
| 2014/0327629 A1 | 11/2014 | Jobs et al. | |
| 2015/0010134 A1* | 1/2015 | Erel | H04M 3/4936 379/88.01 |
| 2015/0348144 A1 | 12/2015 | Zamer | |
| 2016/0104486 A1 | 4/2016 | Penilla | |
| 2016/0124627 A1 | 5/2016 | Beatty et al. | |
| 2016/0261648 A1 | 9/2016 | Ruetschi | |
| 2016/0275523 A1* | 9/2016 | McNea | H04L 51/56 |
| 2017/0011440 A1 | 1/2017 | Shauh et al. | |
| 2017/0024740 A1 | 1/2017 | Todasco et al. | |
| 2017/0070484 A1 | 3/2017 | Kruse et al. | |
| 2018/0005630 A1 | 1/2018 | May et al. | |
| 2018/0025404 A1 | 1/2018 | Harris et al. | |
| 2018/0039965 A1 | 2/2018 | Han et al. | |
| 2018/0084111 A1 | 3/2018 | Pirat | |
| 2018/0096334 A1 | 4/2018 | Studnicka | |
| 2018/0139253 A1 | 5/2018 | Ruetschi | |
| 2018/0285595 A1 | 10/2018 | Jessen | |
| 2018/0293571 A1 | 10/2018 | Chiang et al. | |
| 2018/0325470 A1 | 11/2018 | Fountaine | |
| 2018/0336896 A1* | 11/2018 | McGann | G06F 17/18 |
| 2019/0013017 A1* | 1/2019 | Kang | G06N 5/04 |
| 2019/0037077 A1* | 1/2019 | Konig | H04M 3/5183 |
| 2019/0176837 A1 | 6/2019 | Williams | |
| 2020/0005364 A1 | 1/2020 | Aznaurashvili et al. | |
| 2020/0097965 A1 | 3/2020 | Castoro et al. | |
| 2020/0117858 A1* | 4/2020 | Freeman | G06F 40/117 |
| 2020/0125322 A1 | 4/2020 | Wilde | |
| 2020/0135334 A1 | 4/2020 | Rajasekhar | |
| 2020/0227033 A1 | 7/2020 | Gustman | |
| 2020/0236547 A1 | 7/2020 | Flanagan | |
| 2020/0329144 A1 | 10/2020 | Morgan | |
| 2020/0356999 A1 | 11/2020 | Pandey et al. | |
| 2020/0365153 A1 | 11/2020 | Aquino | |
| 2020/0374394 A1 | 11/2020 | Karp | |
| 2021/0055909 A1 | 2/2021 | Rahim | |
| 2021/0144506 A1 | 5/2021 | Milne et al. | |
| 2021/0272183 A1 | 9/2021 | Turnbull et al. | |
| 2021/0281682 A1 | 9/2021 | Agarwal | |
| 2021/0297531 A1 | 9/2021 | Karp | |
| 2021/0314282 A1* | 10/2021 | Sharma | G06F 3/167 |
| 2021/0369042 A1 | 12/2021 | Gustman | |
| 2021/0385257 A1* | 12/2021 | Synal | H04M 3/42102 |
| 2022/0005028 A1 | 1/2022 | Carlsson et al. | |
| 2022/0109753 A1 | 4/2022 | Google | |
| 2022/0116485 A1* | 4/2022 | Gandhi | H04L 51/216 |
| 2022/0199079 A1 | 6/2022 | Hanson | |
| 2022/0208187 A1 | 6/2022 | Watanabe | |
| 2022/0262343 A1* | 8/2022 | Naylor | G10L 21/003 |
| 2022/0293089 A1* | 9/2022 | Dong | G10L 15/063 |
| 2022/0301558 A1* | 9/2022 | Carmeli | G10L 15/1822 |
| 2022/0308718 A1 | 9/2022 | Klein | |
| 2022/0308828 A1 | 9/2022 | Knapp | |
| 2022/0353213 A1* | 11/2022 | Sharma | G06N 20/00 |
| 2022/0385761 A1* | 12/2022 | Sharma | H04M 3/4935 |
| 2022/0391872 A1* | 12/2022 | Sharma | G06Q 20/363 |
| 2024/0146844 A1* | 5/2024 | Sharma | G10L 15/22 |
| 2024/0205332 A1* | 6/2024 | Tzur | H04M 3/5166 |

FOREIGN PATENT DOCUMENTS

| | | |
|---|---|---|
| JP | 2023-535120 A | 8/2023 |
| WO | WO 2022/076009 A1 | 4/2022 |

(56) References Cited

OTHER PUBLICATIONS

U.S. Appl. No. 17/303,529, filed Jun. 1, 2021, U.S. Pat. No. 11,343,378, Issued.
International Search Report and Written Opinion for PCT/US2021/035221 (ISA/US) mailed Sep. 27, 2021 (18 pages).
Office Action for Japanese Patent Application No. 2023-574439 mailed Jan. 7, 2025, with English translation (11 pages).

* cited by examiner

METHODS, APPARATUSES, AND SYSTEMS FOR DYNAMICALLY NAVIGATING INTERACTIVE COMMUNICATION SYSTEMS

CROSS-REFERENCE TO RELATED APPLICATIONS

The present application is a continuation of U.S. Non-Provisional patent application Ser. No. 17/660,661, filed Apr. 26, 2022 and entitled "Methods, Apparatuses, and Systems for Dynamically Navigating Interactive Communication Systems," which is a continuation of U.S. Non-Provisional patent application Ser. No. 17/303,529, filed Jun. 1, 2021 and entitled "Methods, Apparatuses, and Systems for Dynamically Navigating Interactive Communication Systems," which issued as U.S. Pat. No. 11,343,378 on Jun. 24, 2022, the entire contents of each of which are hereby incorporated herein by reference in their entireties for all purposes.

TECHNICAL FIELD

An example embodiment relates generally to electronic communication technology, particularly in the context of virtual assistants, conversational artificial intelligence, and/or chatbots.

BACKGROUND

In a variety of applications, a user may interact with an interactive communication system (e.g., a communication system of a biller or merchant) in order to, for example, obtain information, pay bills or resolve service issues. In one example, interactive voice response (IVR) systems are automated telephone systems that provide auditory prompts (e.g., words, tones, numbers, etc.) that the caller may select using their touch-tone phone or vocally. The IVR system can then interpret the caller input with regard to the prompts and route the call through the IVR system to a desired destination (e.g., an automated payment processing center, a manned call center, an automated account status message, or the like). IVR systems can sometimes respond to a caller's vocal questions or comments with a vocal response, by initiating a callback, sending an email, or the like. Some IVR systems include or are linked to a chatbot, such as discussed above, which is able to generate a response to a caller's question based upon a static database of questions and answers, and sometimes based upon a caller's account information. Chatbots are interactive, conversational software that are configured to listen to a question from a user and communicate a response to the user. Chatbots are often used by companies on their websites to communicate with users based upon a set list of frequently asked questions and corresponding answers pulled from a static database of the same and/or sometimes based upon a user's account information or personally provided information.

Conventional systems, methods, and apparatuses incorporating interactive communication systems (e.g., bill payment or banking systems) typically require users to remember and input authentication indicia or enter personal information before initiating a payment. In other instances, some conventional approaches require users to enter some or all of their pertinent personally identifying information (PII), bill or account information, transaction information, and payment details (e.g., name on their payment card, payment card number, billing address associated with their payment card, the expiration date of their payment card, a card verification value (CVV) printed on their payment card, etc.) to initiate or complete a secure payment or transaction.

Accordingly, interacting with such interactive communication system (e.g., Chatbots or IVR systems), may be time consuming and tedious for users. For example, a user may have to respond to a plurality of prompts and/or questions presented by the interactive communication system in order to resolve an issue, make a payment, reach a human agent or obtain information. This may result in protracted and costly interactions increasing the likelihood of unsuccessful communication sessions (e.g., where a user is unable to resolve an issue, make a payment, obtain information or the like).

The inventors of the invention disclosed herein have identified these and other technical challenges and have developed the solutions described and otherwise disclosed herein.

SUMMARY

Methods, apparatuses, systems and computer program products are therefore provided in accordance with example embodiments to provide, for example, for dynamically navigating interactive response systems using virtual assistants, conversational artificial intelligence, and/or chatbots.

According to a first embodiment, a method is provided. The method can comprise receiving, from a user device, sound waves or audio information, the sound waves or audio information indicative of a request to initiate an interactive communication session with a communication system of a biller or merchant; interpreting, based on the sound waves or audio information, an intent of the communication session and an identity of the biller or merchant; retrieving a predetermined interaction coding associated with the biller or merchant; and initiating the interactive communication session with the communication system of the biller or merchant based on the predetermined interaction coding.

In some embodiments, the method can further comprise retrieving, from a database of biller or merchant interaction coding information, based on the intent of the communication session and the identity of the biller or merchant, the predetermined interaction coding associated with the biller or merchant.

In some embodiments, the method can further comprise retrieving an interaction map associated with the biller or merchant; and determining, from the interaction map, based on the intent of the communication session, the predetermined interaction coding.

In some embodiments, the method can further comprise generating, based on the predetermined interaction coding, one or more tones associated with one or more values from the predetermined interaction coding; and determining, based on an aural response from the interactive communication system of the biller or merchant, that the biller or merchant is ready to communicate directly with a user of the user device.

In some embodiments, the method can further comprise providing, to the user via the user device, a notification that the interactive communication session with the biller or merchant has been initiated.

In some embodiments, the method can further comprise, in an instance in which the interactive communication system of the biller or merchant is determined to be ready to communicate with a user via the user device or another user device, causing presentation of an audio or visual prompt at the user device or the another user device indicative of a request for the user to join the communication session;

determining, from a user response, contact, gesture, or interaction with the user device or the other user device, whether the user intends to join the interactive communication session; and in an instance in which it is determined that the user intends to join the interactive communication session, causing the user device or the another user device to allow the user to join the interactive communication session between the user device and the interactive communication system of the biller or merchant.

In some embodiments, the method can further comprise receiving a prompt, and, based on a syntactical analysis of the prompt, providing a tonal or aural response to the prompt to navigate the interactive communication system based on the intent.

In some embodiments, the method can further comprise providing an interface where the biller or merchant can update and add to the interaction map, where the update and addition can apply to, but not be limited to, predetermined interaction codings, prompts and intents; and confirming that the update and addition is successful to the merchant or biller through a confirmation message, wherein one possible embodiment is a confirmation email.

In some embodiments, the method can further comprise, in an instance in which the biller or merchant is determined to not be ready to communicate with the user, determining that the predetermined interaction coding is wrong and initiating a second call with the biller or merchant; dynamically navigating, based on the intent, the interaction map of the biller or merchant; amending the predetermined interaction coding based on dynamic navigation of the interaction map; and saving the amended predetermined interaction coding to the interaction map.

In some embodiments, the method can further comprise, in an instance in which the biller of merchant is determined to not be ready to communicate with the user, determining that there is not an predetermined interaction coding that is stored in the database associated with the biller/merchant OR that all predetermined interaction codings stored in the database and associated with the biller/merchant are assigned to other intents that are different and distinct from the intent of the communication session; dynamically navigating, based on the intent, the interactive communication system of the biller/merchant; generating a new predetermined interaction coding based on dynamic navigation of interactive communication system; and saving the new predetermined interaction coding to the biller/merchant's database.

In some embodiments, the method can further comprise providing, based on the predetermined interaction coding, an aural response associated with values from the predetermined interaction coding; and determining, based on a response from the interactive communication system of the biller or merchant, that an action based on the intent is successful.

According to a second embodiment, a system for dynamically navigating an interactive communication system is provided. The system can comprise a computing device comprising at least one processor, a user device, and an external computing device, the system configured to: receive, by the computing device from the user device, sound waves or audio information, the sound waves or audio information indicative of a request to initiate a communication session with a communication system of a biller or merchant; transmit, by the computing device, the sound waves or audio information to the external computing device; determine, by the external computing device, an intent of the call and the identity of the merchant or biller based on interpreting the sound waves or audio information; retrieve, by the external computing device an interaction mapping string associated with the intent of the call; transmit, by the external computing device, the interaction mapping string to the computing device; receive, by the computing device, the interaction mapping string; and initiate, by the computing device, the communication session with the communication system of the biller or merchant based on the interaction mapping string.

In some embodiments, the computing device is further configured to dynamically communicate with the communication system of the biller or merchant based on the interaction mapping string.

In some embodiments, at least one of the computing device, the user device and the external computing device comprises one or more chatbots.

In some embodiments, the computing device is further configured to: determine that the communication system is ready to communicate with a user of the user device or another user device; cause presentation of an audio or visual prompt at the user device or another user device indicative of a request for the user to join the communication session; and in an instance in which it is determined that the user intends to join the communication session, causing the user device or the another user device to allow the user to join the call between the user device and the communication system of the biller or merchant.

In some embodiments, the interactive mapping string comprises a predetermined interaction coding defining predetermined textual or aural responses to prompts received from the communication system of the biller or merchant.

In some embodiments, the computing device is further configured to update or modify the interaction mapping string based on the communication session.

In some embodiments, the computing device is further configured to update or modify the interaction mapping string by updating a database associated with the biller or merchant.

According to a third embodiment, a method is provided. In some embodiments, the method can comprise receiving, from a user device, sound waves or audio information, the sound waves or audio information indicative of a request to initiate a call with an interactive voice response (IVR) system of a biller or merchant; interpreting, based on the sound waves or audio information, an intent of the call and an identity of the biller or merchant; retrieving an IVR string associated with the biller or merchant; and initiating the call with the IVR system of the biller or merchant based on the IVR string.

In some embodiments, the method can further comprise retrieving, from a database of biller or merchant IVR information, based on the intent of the call and the identity of the biller or merchant, the IVR string associated with the biller or merchant.

In some embodiments, the method can further comprise retrieving an IVR tree associated with the biller or merchant; and determining, from the IVR tree, based on the intent of the call, the IVR string.

In some embodiments, the method can further comprise generating, based on the IVR string, one or more tones associated with one or more values from the IVR string; and determining, based on an aural response from the IVR system of the biller or merchant, that the biller or merchant is ready to communicate directly with a user of the user device.

In some embodiments, the method can further comprise providing, to the user via the user device, a notification that the call with the biller or merchant has been initiated.

In some embodiments, the method can further comprise, in an instance in which the IVR system of the biller or merchant is determined to be ready to communicate with a user via the user device or another user device, causing presentation of an audio or visual prompt at the user device or the another user device indicative of a request for the user to join the call; and determining, from a user response, contact, gesture, or interaction with the user device or the other user device, whether the user intends to join the call; and in an instance in which it is determined that the user intends to join the call, causing the user device or the another user device to allow the user to join the call between the user device and the IVR system of the biller or merchant.

In some embodiments, the method can further comprise receiving an IVR prompt, and, based on a syntactical analysis of the IVR prompt, providing a tonal or aural response to the IVR prompt to navigate the IVR system based on the intent.

In some embodiments, the method can further comprise providing an interface where the biller or merchant can update and add to the IVR tree, where the update and addition can apply to, but not be limited to, IVR strings, IVR prompts and intents; and confirming that the update and addition is successful to the merchant or biller through a confirmation message, wherein one possible embodiment is a confirmation email.

In some embodiments, the method can further comprise, in an instance in which the biller or merchant is determined to not be ready to communicate with the user, determining that the IVR string is wrong and initiating a second call with the biller or merchant; dynamically navigating, based on the intent, the IVR tree of the biller or merchant; amending the IVR string based on dynamic navigation of the IVR tree; and saving the amended IVR string to the IVR tree.

In some embodiments, the method can further comprise in an instance in which the biller of merchant is determined to not be ready to communicate with the user, determining that there is not an IVR string that is stored in the database associated with the biller/merchant OR that all IVR strings stored in the database and associated with the biller/merchant are assigned to other intents that are different and distinct from the intent of the call; dynamically navigating, based on the intent, the IVR system of the biller/merchant; generating a new IVR string based on dynamic navigation of IVR system; and saving the new IVR string to the biller/merchant's IVR database.

In some embodiments, the method can further comprise entering, based on the IVR string, a plurality of tones associated with values from the IVR string; and determining, based on an aural response from the IVR system of the biller or merchant, that an action based on the intent is successful.

According to a fourth embodiment, another method is provided. The method can comprise receiving, at a user device, sound waves or audio information, the sound waves or audio information indicative of a request to initiate a call with an interactive voice response (IVR) system of a biller or merchant; transmitting the sound waves or audio information to an external computing device, the external computing device configured to interpret, from the sound waves or audio information, an intent of the call and an identity of the biller or merchant; receiving, from the external computing device, an IVR string associated with an IVR system of the biller or merchant; and initiating the call with the IVR system of the biller or merchant based on the IVR string.

In some embodiments, the IVR string associated with the biller or merchant can be stored in a biller or merchant IVR database.

In some embodiments, the method can further comprise retrieving an IVR system mapping or an IVR tree associated with the IVR system of the biller or merchant; and determining, from the IVR system mapping or IVR tree, based on the intent of the call, an IVR string.

In some embodiments, the method can further comprise generating, based on the IVR string, one or more tones associated with one or more values from the IVR string; and determining, based on an aural response from the IVR system of the biller or merchant, that the biller or merchant is ready to communicate directly with a user of the user device.

In some embodiments, the method can further comprise providing, to the user via the user device, a notification that the call with the biller or merchant has been initiated.

In some embodiments, the method can further comprise, in an instance in which the IVR system of the biller or merchant is determined to be ready to communicate with a user via the user device or another user device, causing presentation of an audio or visual prompt at the user device or the another user device indicative of a request for the user to join the call; determining, from a user response, contact, gesture, or interaction with the user device or the other user device, whether the user intends to join the call; and in an instance in which it is determined that the user intends to join the call, causing the user device or the another user device to allow the user to join the call between the user device and the IVR system of the biller or merchant.

In some embodiments, the method can further comprise receiving an IVR prompt, and, based on a syntactical analysis of the IVR prompt, providing a tonal response to the IVR prompt to navigate the IVR tree based on the intent.

In some embodiments, the method can further comprise providing an interface where the biller or merchant can update and add to the IVR tree, where the update and addition can apply to, but not be limited to, IVR strings, IVR prompts and intents; and confirming that the update and addition is successful to the biller or merchant through a confirmation message, wherein one possible embodiment is a confirmation email.

In some embodiments, the method can further comprise in an instance in which the biller or merchant is determined to not be ready to communicate with a user, determining that the IVR string is wrong and initiating a second call with biller or merchant; dynamically navigating, based on intent, the IVR tree of the biller or merchant; amending the IVR string based on dynamic navigation of the IVR tree; and saving the amended IVR string to the IVR tree.

In some embodiments, the method can further comprise in an instance in which the biller of merchant is determined to not be ready to communicate with the user, determining that there is not an IVR string that is stored in the database associated with the biller/merchant OR that all IVR strings stored in the database and associated with the biller/merchant are assigned to other intents that are different and distinct from the intent of the call; dynamically navigating, based on the intent, the IVR system of the biller/merchant; generating a new IVR string based on dynamic navigation of IVR system; and saving the new IVR string to the biller/merchant's IVR database.

In some embodiments, the method can further comprise entering, based on the IVR string, a plurality of tones associated with values from the IVR string; and determining, based on an aural response from the IVR system of the biller or merchant, that an action based on the intent is successful.

According to a fifth embodiment, an apparatus is provided that comprises a processor and a memory storing program code. The memory and the program code can be configured, with the processor, at least to receive, at a user device, sound waves or audio information, the sound waves or audio information indicative of a request to initiate a call with an interactive voice response (IVR) system of a biller or merchant; interpret, based on the sound waves or audio information, an intent of the call and an identity of the biller or merchant; retrieve an IVR string associated with the biller or merchant; and initiate the call with the IVR system of the biller or merchant based on the IVR string.

In some embodiments, the at least one processor can be further configured, with said memory storing program code, at least to retrieve, from a database of biller or merchant IVR information, based on the intent of the call and the identity of the biller or merchant, the IVR string associated with the biller or merchant.

In some embodiments, the at least one processor can be further configured, with said memory storing program code, at least to retrieve, an IVR tree associated with the biller or merchant; and determine, from the IVR tree, based on the intent of the call, an IVR string.

In some embodiments, the at least one processor can be further configured, with said memory storing program code, at least to enter, based on the IVR string, one or more tones associated with one or more values from the IVR string; and determine, based on an aural response from the IVR system of the biller or merchant, that the biller or merchant is ready to communicate directly with a user of the user device.

In some embodiments, the at least one processor can be further configured, with said memory storing program code, at least to provide, to the user via the user device, a notification that the call with the IVR system of the biller or merchant has been initiated.

In some embodiments, the at least one processor can be further configured, with said memory storing program code, at least to, in an instance in which the IVR system of the biller or merchant is determined to be ready to communicate with a user via the user device or another user device, cause presentation of an audio or visual prompt at the user device or the another user device indicative of a request for the user to join the call; determine, from a user response, contact, gesture, or interaction with the user device or the other user device, whether the user intends to join the call; and in an instance in which it is determined that the user intends to join the call, cause the user device or the another user device to allow the user to join the call between the user device and the IVR system of the biller or merchant.

In some embodiments, the at least one processor can be further configured, with said memory storing program code, at least to receive an IVR prompt, and, based on a syntactical analysis of the IVR prompt, providing a tonal response to the IVR prompt to navigate the IVR tree based on the intent.

In some embodiments, the at least one processor can be further configured, with said memory storing program code, at least to provide an interface where the biller or merchant can update and add to the IVR tree, where the update and addition can apply to, but not be limited to, IVR strings, IVR prompts and intents; and confirm that the update and addition is successful to the biller through a confirmation message, wherein one possible embodiment is a confirmation email.

In some embodiments, the at least one processor can be further configured, with said memory storing program code, at least to, in an instance in which the biller or merchant is determined to not be ready to communicate with a user, determine that the IVR string is wrong and initiate a second call with biller/merchant; dynamically navigate, based on intent, the IVR tree of the biller or merchant; amend the IVR string based on dynamic navigation of the IVR tree; and save the amended IVR string to the IVR tree.

In some embodiments, the at least one processor can be further configured, with said memory storing program code, at least to, in an instance in which the biller of merchant is determined to not be ready to communicate with the user, determine that there is not an IVR string that is stored in the database associated with the biller/merchant OR that all IVR strings stored in the database and associated with the biller/merchant are assigned to other intents that are different and distinct from the intent of the call; dynamically navigate, based on the intent, the IVR system of the biller/merchant; generate a new IVR string based on dynamic navigation of IVR system; and save the new IVR string to the biller/merchant's IVR database.

In some embodiments, the at least one processor can be further configured, with said memory storing program code, at least to enter, based on the IVR string, a plurality of tones associated with values from the IVR string; and determine, based on an aural response from the IVR system of the biller or merchant, that an action based on the intent is successful.

According to a sixth embodiment, an apparatus is provided that comprises a processor and a memory storing program code. The memory and the program code can be configured, with the processor, at least to receive, at a user device, sound waves or audio information, the sound waves or audio information indicative of a request to initiate a call with an interactive voice response (IVR) system of a biller or merchant; transmit the sound waves or audio information to an external computing device, the external computing device configured to interpret, from the sound waves or audio information, an intent of the call and an identity of the biller or merchant; receive, from the external computing device, an IVR string associated with the IVR system of the biller or merchant; and initiate the call with an IVR system of the biller or merchant based on the IVR string.

In some embodiments, the at least one processor can be further configured, with said memory storing program code, at least to retrieve, a IVR system mapping or an IVR tree associated with the IVR system of the biller or merchant; and determine, from the IVR system mapping or IVR tree, based on the intent of the call, an IVR string.

In some embodiments, the at least one processor can be further configured, with said memory storing program code, at least to enter, based on the IVR string, one or more tones associated with one or more values from the IVR string; and determine, based on an aural response from the IVR system of the biller or merchant, that the biller or merchant is ready to communicate directly with a user of the user device.

In some embodiments, the at least one processor can be further configured, with said memory storing program code, at least to provide, to a user via the user device, a notification that the call with the biller or merchant has been initiated.

In some embodiments, the at least one processor can be further configured, with said memory storing program code, at least to, in an instance in which the IVR system of the biller or merchant is determined to be ready to communicate with a user via the user device or another user device, cause presentation of an audio or visual prompt at the user device or the another user device indicative of a request for the user to join the call; determine, from a user response, contact, gesture, or interaction with the user device or the other user device, whether the user intends to join the call; and in an instance in which it is determined that the user intends to join the call, cause the user device or the another user device to allow the user to join the call between the user device and the IVR system of the biller or merchant.

In some embodiments, the at least one processor can be further configured, with said memory storing program code, at least to receive an IVR prompt, and, based on a syntactical analysis of the IVR prompt, provide a tonal response to the IVR prompt to navigate the IVR tree based on the intent.

In some embodiments, the at least one processor can be further configured, with said memory storing program code, at least to provide an interface where the biller or merchant can update and add to the IVR tree, where the update and addition can apply to, but not be limited to, IVR strings, IVR prompts and intents; and confirm that the update and addition is successful to the biller through a confirmation message, wherein one possible embodiment is a confirmation email.

In some embodiments, the at least one processor can be further configured, with said memory storing program code, at least to, in an instance in which the biller or merchant is determined to not be ready to communicate with a user, determine that the IVR string is wrong and initiate a second call with biller/merchant; dynamically navigate, based on intent, the IVR tree of the biller/merchant; amend the IVR string based on dynamic navigation of the IVR tree; and save amended IVR string to the IVR tree.

In some embodiments, the at least one processor can be further configured, with said memory storing program code, at least to, in an instance in which the biller of merchant is determined to not be ready to communicate with the user, determine that there is not an IVR string that is stored in the database associated with the biller/merchant OR that all IVR strings stored in the database and associated with the biller/merchant are assigned to other intents that are different and distinct from the intent of the call; dynamically navigate, based on the intent, the IVR system of the biller/merchant; generate a new IVR string based on dynamic navigation of the IVR system; and save the new IVR string to the biller/merchant's IVR database.

In some embodiments, the at least one processor can be further configured, with said memory storing program code, at least to enter, based on the IVR string, a plurality of tones associated with values from the IVR string; and determine, based on an aural response from the IVR system of the biller or merchant, that an action based on the intent is successful.

DETAILED DESCRIPTION

Figure 1:
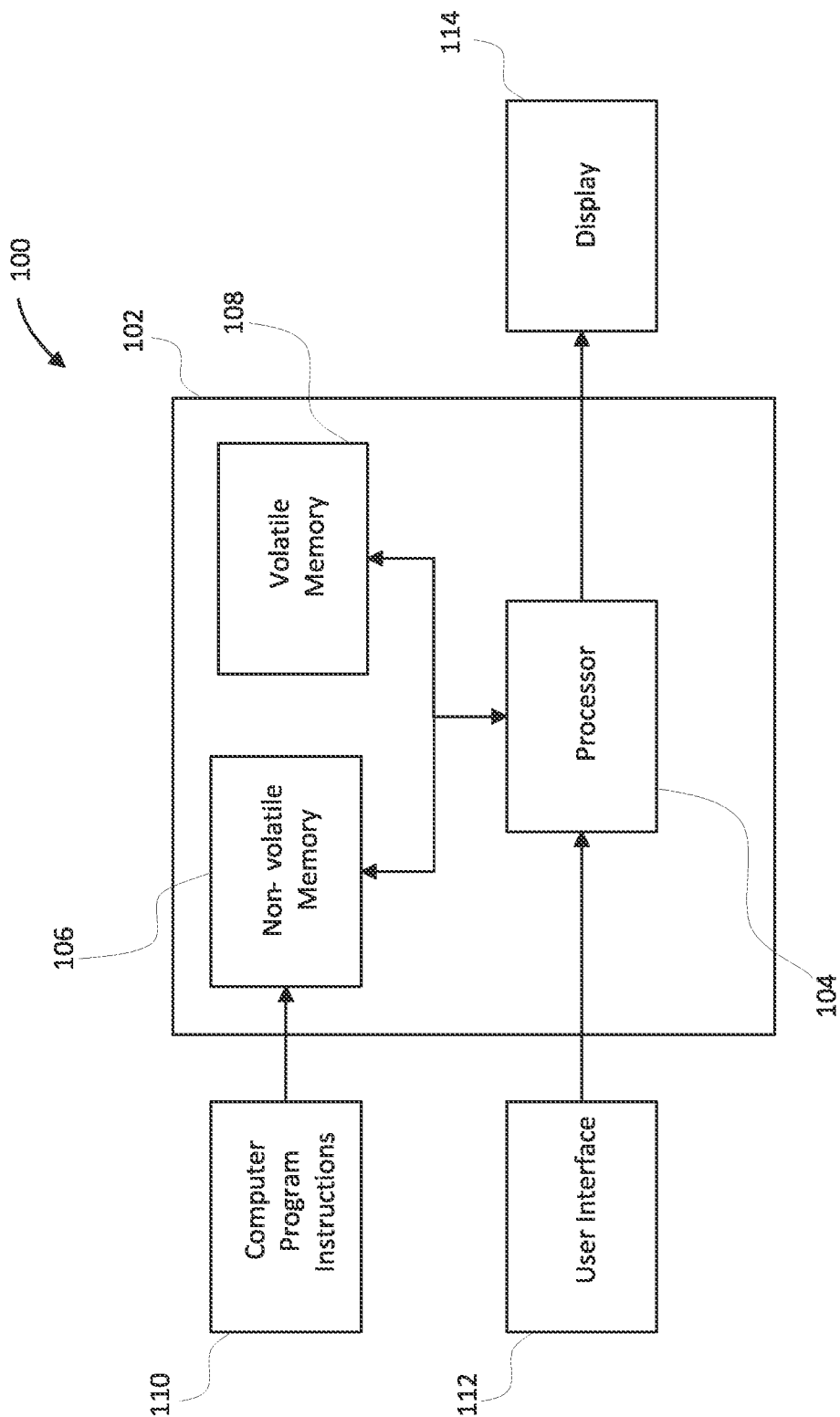
FIG. 1 is an apparatus diagram illustrating a computing device for carrying out one or more aspects of the currently disclosed invention.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Embodiments described herein relate generally to systems, methods, apparatuses, and computer program products for dynamically navigating interactive communication systems using virtual assistants, conversational artificial intelligence, chatbots, and/or the like.

Referring now to FIG. 1, an apparatus 100 is illustrated for communicating with a user, initiating a user session with an API and/or another network entity. The apparatus can receive sound waves or audio information indicative of a request to initiate a call with an interactive voice response (IVR) system and initiate the call to the IVR system of a biller or merchant. The apparatus 100 can comprise a computing device 102 that includes at least a processor 104 and one or both of a non-volatile memory 106 and a volatile memory 108. In some embodiments, the computing device 102 can be configured such that the processor 104 can be operably coupled to or otherwise in communication with one or both of the non-volatile memory 106 and the volatile memory 108. In some embodiments, the computing device 102 can comprise a laptop computer, a desktop computer, a cloud computing device, a server, a network, a hand-held computer, a mobile computing device, a mobile phone, a personal digital assistant, a tablet computer, any combination thereof, or the like.

In some embodiments, the processor 104 may comprise any electronic circuit configured to perform operations on a memory, such as the non-volatile memory 106 or volatile memory 108 or the like. In some embodiments, the processor 104 can comprise a central processing unit, a graphics processing unit, a vision processing unit, a tensor processing unit, a neural processing unit, a digital signal processor, an image signal processor, a synergistic processing element, a field-programmable gate array, a sound chip, or the like. In some embodiments, the processor 104 can comprise an arithmetic logic unit (not shown), a control unit (not shown), a speed clock (not shown), and the like. In some embodiments, the processor 104 can comprise one or more processing chips, microcontrollers, integrated chips, sockets, systems on a chip (SoC), array processor, vector processor, peripheral processing components, and the like.

In some embodiments, the non-volatile memory 106 can comprise any computer memory or memory device that can retain stored information even when not powered, such a read-only memory (ROM), flash memory, magnetic computer storage devices such as hard disks, floppy discs, magnetic tape, optical discs, FeRAM, CBRAM, PRAM, SONOS, RRAM, Racetrack memory, NRAM, Millipede, combinations thereof, and the like.

In some embodiments, the volatile memory 108 can comprise any computer memory or memory device that requires power to maintain the stored information, such as static random access memory (RAM), dynamic RAM, Z-RAM, TTRAM, A-RAM, ETA RAM, any combination thereof, or the like.

In some embodiments, the processor 104 or another such component of the computing device 102 can be configured to carry out a process or method based on computer program instructions 110. In some embodiments, the computer program instructions 110 can be stored on one of the non-volatile memory 106 and the volatile memory 108. In some embodiments, the computer program instructions 110 can be operable to cause the processor 104 to carry out any of the methods, approaches, processes, or the like disclosed herein. In some embodiments, the computer program instructions 110 can comprise computer-readable instructions, computer code, a coded application, and/or the like.

In the apparatus 100, the processor 104 (and/or co-processors or any other circuitry assisting or otherwise associated with the processor 104) may be in communication with the memory 106 or 108 via a bus for passing information among components of the apparatus 100. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor 104). The memory device may be configured to store information, data, content, applications, instructions, or the like for enabling the apparatus to carry out various functions in accordance with an example embodiment of the present disclosure. For example, the memory device could be configured to buffer input data for processing by the processor 104. Additionally or alternatively, the memory device could be configured to store instructions for execution by the processor 104, such as storing a message to be executed by the processor 104 and displayed on the user interface.

The apparatus 100 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 104 may be embodied in a number of different ways. For example, the processor 104 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 104 may include one or more processing cores configured to perform independently. A multi-core processor 104 may enable multiprocessing within a single physical package. Additionally or alternatively, the processor 104 may include one or more processors 104 configured in tandem via the bus to enable independent execution of instructions, pipelining and/or multithreading.

In an example embodiment, the processor 104 may be configured to execute instructions stored in the memory 106 or 108 or otherwise accessible to the processor 104. Alternatively or additionally, the processor 104 may be configured to execute hard coded functionality. As such, whether configured by hardware or software methods, or by a combination thereof, the processor 104 may represent an entity (e.g., physically embodied in circuitry) capable of performing operations according to an embodiment of the present disclosure while configured accordingly. Thus, for example, when the processor 104 is embodied as an ASIC, FPGA or the like, the processor 104 may be specifically configured hardware for conducting the operations described herein. Alternatively, as another example, when the processor 104 is embodied as an executor of instructions, the instructions may specifically configure the processor 104 to perform the algorithms and/or operations described herein when the instructions are executed. However, in some cases, the processor 104 may be a processor 104 of a specific device (e.g., an encoder and/or a decoder) configured to employ an embodiment of the present disclosure by further configuration of the processor 104 by instructions for performing the algorithms and/or operations described herein. The processor 104 may include, among other things, a clock, an arithmetic logic unit (ALU) and logic gates configured to support operation of the processor 104.

In some embodiments, the apparatus 100 can further include a communication interface. In some embodiments, the communication interface may be any means such as a device or circuitry embodied in either hardware or a combination of hardware and software that is configured to receive and/or transmit data from/to a network and/or any other device or module in communication with the apparatus 100, such as an wireless local area network (WLAN), core network, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 100 can further comprise a user interface 112 configured such that a user or viewer can input data, information, requests, commands, or the like to the computing device 102 via any suitable input approach. For instance, in some embodiments, the user or viewer may input a command or other suitable inputs verbally, textually, via a signal such as an optical signal or electrical signal, digitally via any suitable computer language, visually, a combination of these, or the like. As such, the user interface 112 can comprise any of a variety of input devices suitable to capture a user's or viewer's input. Some but not all of the suitable input devices are a video camera, a microphone, a digital pointing device such as a mouse or touchpad, an interactive touchscreen, a virtual reality environment, an augmented reality environment, one or more sensors configured to sense a gesture made by the user or viewer, combinations thereof, or the like.

In some embodiments, the processor 104 can be operably coupled to or otherwise in communication with the user interface 112 such that a user or viewer can input data, information, requests, commands, or the like to the computing device 102 via any suitable input approach. By way of example only, in some embodiments, the user interface 112 can comprise a video camera configured to capture video of a user or view, a microphone configured to capture audio from a user or viewer, and an audio/video processing unit configured to interpret gestures, audio, or other types of inputs from the user or viewer and interpret the input as a command, question, data input, or the like.

In some embodiments, the apparatus 100 can further comprise a display 114 configured to present media content to a user or viewer. In some embodiments, the display 114 can be operably coupled to or otherwise in communication with the processor 104 or another such component of the computing device 102. In some embodiments, the display 114 can be coupled to or integrated into the same hardware device as the user interface 112 such that the same user or viewer may transmit inputs to the computing device 102 while the computing device 102 can transmit media content to the display 114 to present or cause the display 114 to present the media content to the user or viewer. By way of example only, such an integrated hardware device that comprises the user interface 112 and the display 114 could be an interactive display or monitor, a computer screen, a touch-sensitive display, a head-mounted display, a display with an integrated video camera and/or microphone, a display with an integrated sensor, or a display configured to otherwise capture input information (e.g., sound waves, audio information, commands, data, questions, comments, and the like) from the user or viewer.

In some embodiments, the apparatus 100 can be either a server-side device or a user device. In some embodiments, the apparatus 100 or a component thereof can be configured to be in wired or wireless communication with a network, a server, telecommunications equipment, a user device, another computing device, another processor, another memory device, and/or a mobile device such as a mobile phone or tablet.

Figure 2:
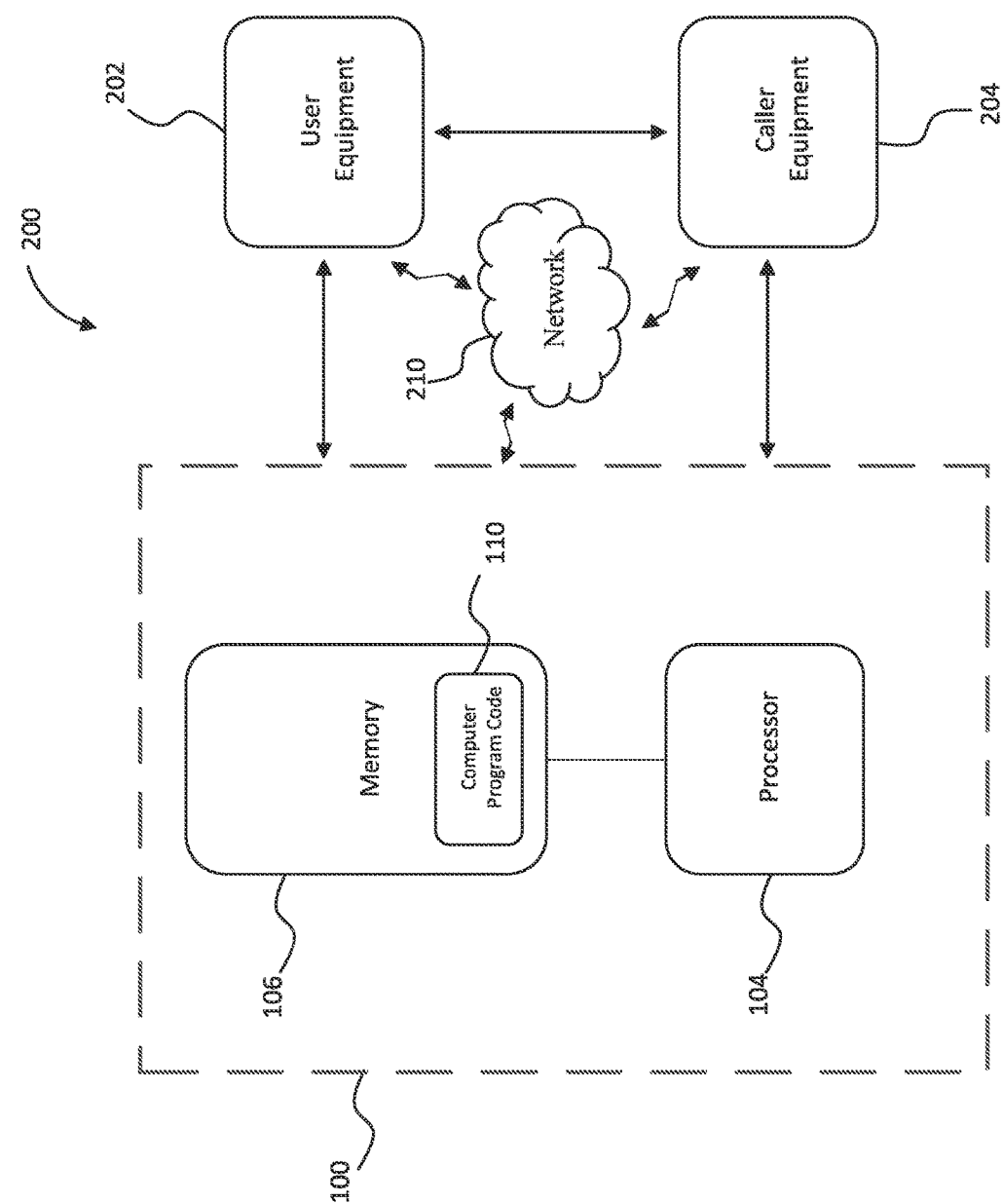
FIG. 2 is a distributed cloud server diagram illustrating a system for carrying out one or more aspects of the currently disclosed invention.

In some embodiments, such as illustrated in FIG. 2, the apparatus 100 or a component thereof can be a part of a system 200 and in communication with a user equipment 202, a caller equipment 204 and/or the like via a network 210. In some embodiments, the system 200 or a component thereof, e.g., the network 210, can be stored, hosted, accessible via, or transmitted through a cloud computing environment, server, and/or the like. In some embodiments, the user equipment 202 can be a user's computer, such as a laptop or desktop computer, a mobile phone, a PDA, or the like. In some embodiments, the caller equipment 204 can be any suitable equipment, devices, or systems operated by or on behalf of a payee rendering the interactive bill for the payor (user or viewer of the apparatus 100). In some embodiments, the caller equipment 204 can comprise a telephone, such as a mobile phone, and/or a computing device such as described above with regard to apparatus 100, such as a computing device carrying out voice-over-internet protocol (VoIP) communications. In some embodiments, a caller equipment 204 can comprise a smart device, such as a virtual assistant operated by, stored on, and/or accessed by a smart speaker and/or another suitable playback or communications device. In some embodiments, a smart speaker can be configured to be in constant listening mode or in a sleep mode with low-power, non-recorded listening in the background such that a trigger word or a waking word can be used to awaken the smart speaker. In some embodiments, when the smart speaker hears a wake word, the smart speaker can switch to an active listening mode. In the active listening mode, a user may make a comment or ask a question, which the smart speaker may capture sound waves or audio information via any suitable microphone or sensor and convert the sound waves or audio information into text, which can be used to determine an intent with respect to the captured sound waves or audio information and perform an action such as, for example, initiate a communication session (e.g., a call) with an interactive communication system (e.g., IVR system) of a biller or merchant.

In some embodiments, some aspects or components of the system 200 can be similar to or the same as corresponding aspects or components of the apparatus 100 and are therefore not described in further detail here. It is noted, however, that any of the previously described circuitry, components, communications devices, processors, memories, and the like, can be the same or similar to those described above with respect to the apparatus 100.

In some embodiments, the system 200 can comprise a chatbot stored at the apparatus 100 and/or the network 210. In some embodiments, a chatbot may be configured to capture/listen to ambient audio around the computing device on which the chatbot is stored. In some embodiments, the computing device, configured to store and operate the chatbot, further comprises a sensor or a microphone. In some embodiments, the sensor or microphone can be configured to operate in two or more states, such as a sleep mode, a low-power mode, a passive listening mode, an active listening mode, and/or the like. In some embodiments, the sensor or microphone can be configured to operate normally in sleep mode or another suitable mode in which the sensor or microphone listens for a wake word or another suitable trigger word which can cause the sensor or microphone to transition from sleep mode to active listening mode or another suitable mode. In some embodiments, in sleep mode, the microphone may sense all local ambient sound, transfer the local ambient sound to a processor which is configured to determine whether the ambient sound includes the trigger word. In some embodiments, the processor may convert the sound waves or audio information (e.g., ambient sound) to text and then parse the text into words and conduct a search for the trigger word. In some embodiments, such a search by the processor can include the use of natural language processing, or the like. In some embodiments, when the processor determines that a trigger word has not been spoken, the segment of ambient audio sensed by the sensor or microphone can be discarded. In some embodiments, when the processor determines that a trigger word has been spoken, the processor can cause the microphone to operate in active listening mode and can initiate the chatbot or the like to determine the intent of a question or command based upon a parsing of spoken words from the audio for a period of time following detecting of the trigger word.

Natural language processing (NLP) is a field of computer science, artificial intelligence, and linguistics concerned with the interactions between computers and human (natural) languages. Natural language processing includes natural language understanding (NLU) and natural language generation (NLG). NLU deals with machine reading comprehension, enabling computers to derive meaning from input containing natural language. NLG deals with the conversion of a computer-based representation of information into natural language, enabling computers to generate natural language from a machine representation system. Effectively, NLU and NLG are opposite processes, with NLU translating natural language into meaning in the machine representation system, and with NLG translating meaning in the machine representation system into natural language.

Devices that utilize speech processing may provide unique NLU responses that are personalized for a particular user or users. In particular, when natural language understanding (also referred to as NLU processing) is performed to resolve the meaning of a user's utterance, a personalized lexicon specific to the user and knowledge relating specifically to the device being spoken to may be used to resolve ambiguity and interpret meaning.

In some embodiments, when a processor initiates a chatbot, the processor can also initiate a user session, which is a log entry for a particular interaction with a user via a particular device (e.g., cell phone, smart speaker, or the like). In some embodiments, the user session can comprise all conversational elements from a time that the processor determines a user has spoken a trigger word until such a time that the user discontinues the conversation, or the processor determines that the user has discontinued the conversation, such as based upon a threshold period of time of silence or a user's unresponsiveness to a particular prompt or conversational element from the processor (e.g., via a speaker or the like).

In some embodiments, a processor can be configured to initiate a chatbot software program that is stored on a local memory device and/or a remote memory device. In some embodiments, a local smart device may comprise a microphone, a sensor, and/or a processor, such as a processor configured only to relay sensed audio from the microphone or sensor to a remote processor that is configured to determine if a trigger word has been spoken by a user.

For example, a user may activate a smart device using a trigger word and then ask to initiate a communication session or call. In response, the smart device may interpret an intent of the call and an identity of the biller or merchant. By way of example, the smart device may determine that the intent of the call is to inquire about an account balance with a first bank. Accordingly, the smart device may call upon the chatbot associated with the first bank by sending a connection request to a network entity associated with the first bank. In some embodiments, the first bank may have a pre-established relationship with the smart device of the user such that the connection request is recognized by the network entity of the first bank as being associated with said user. In such an instance, the network entity of the first bank may initiate a chatbot associated with the first bank and establish a connection directly between the smart device and the chatbot of the first bank. In such an instance, the smart device may then act like a relay between the chatbot of the first bank and the user. For instance, the smart device may simply relay audio captured by the sensor or microphone of the smart device to the chatbot associated with the first bank. On the other hand, the smart device may comprise a processor that is configured to convert audio to text such that the smart device may simply relay a parsed textual transcript or partial transcript of the user's side of the conversation to the chatbot. The chatbot can then interpret the question or comment from the user for intent and generate a suitable textual response based upon the information provided in an account file associated with the user's account at the first bank and based upon a database of relevant and general information, such as questions and possible associated answers. Once the textual response to the user's comment or question is generated by the chatbot, the chatbot can transmit the textual response to the smart device, which can generate a natural language audio format based upon the textual response, or the chatbot can generate the natural language audio format directly from the textual format and can relay the natural language audio format to the smart device. The smart device can then cause a speaker or the like to transmit the generated natural language audio format response to the user. In some embodiments, the smart device may retrieve an interaction map or IVR information from a database of the biller or merchant. In some examples, the smart device may retrieve an IVR string, IVR information or the like from a database of the biller of merchant comprising IVR system information. In some embodiments, the smart device may initiate the communication session (e.g., call) with the interactive communication system (e.g., IVR system) of the biller or merchant based on the predetermined interaction coding or IVR string.

In some embodiments, during the same user session, prior to initiating a communication session or call with an interactive communication system or IVR system of a biller or merchant and/or at the same time that the smart device is establishing a connection with the chatbot of the first bank, the smart device may also, for instance, retrieve from a database, e.g., a database of biller or merchant an interaction map or IVR information, based on the intent of the call and the identity of the biller or merchant, a predetermined interaction coding or IVR string associated with the biller or merchant. The smart device may enter, based on the predetermined interaction coding or IVR string, a plurality of tones associated with values from the predetermined interaction coding or IVR string and determine, based on a response (e.g., aural response) from the interactive communication system or IVR system of the biller or merchant, that the biller or merchant is ready to communicate directly with the user of the smart device. In some embodiments, the smart device may provide, to the user via the smart device a notification that the communication session or call with the biller or merchant has been initiated. In some embodiments, providing, to the user via the user device, a notification that the communication session or call with the biller or merchant has been initiated. In some embodiments, in an instance in which the IVR system of the biller or merchant is determined to be ready to communicate with the user, the smart device may cause presentation of an audio or visual prompt at the user device or the another user device indicative of a request for the user to join the communication session or call. In some embodiments, the smart device may determine, from a user response, contact, gesture, or interaction with the user device or the other user device, whether the user intends to join the communication session or call. In an instance in which it is determined that the user intends to join the communication session or call, the smart device may cause the user device or the another user device to allow the user to join the communication session or call between the user device and the interactive communication system or IVR system of the biller or merchant. In some examples, the smart device may, subsequent to receiving a prompt (e.g., an IVR prompt), and, based on a syntactical analysis of the prompt, provide a tonal response to the prompt to navigate the interaction map or IVR tree based on the intent. In some embodiments, the smart device may provide an interface where the biller or merchant can update and add to the interaction map or IVR tree, where the update and addition can apply to, but not be limited to, predetermined interaction codings, IVR strings, prompts and intents. In some embodiments, the smart device may confirm that the update and addition is successful to the biller through a confirmation message, wherein one possible embodiment is a confirmation email. In some embodiments, in an instance in which the biller or merchant is determined to not be ready to communicate with the user, the smart device may determine that the predetermined interaction coding or IVR string is wrong and re-initiate the communication session or call with biller/merchant. In some embodiments, the smart device may dynamically navigate, based on intent, the interaction map or IVR tree of the biller/merchant. In some embodiments, the smart device may amend the predetermined interaction coding or IVR string based on dynamic navigation of the interaction map or IVR tree and save the amended predetermined interaction coding or IVR string to the interaction map or IVR tree. In some embodiments, in an instance in which the biller of merchant is determined to not be ready to communicate with the user, the smart device may determine that there is not a predetermined interaction coding or an IVR string that is stored in the database associated with the biller/merchant or that all predetermined interaction codings or IVR strings stored in the database and associated with the biller/merchant are assigned to other intents that are different and distinct from the intent of the call. In some embodiments, the smart device may generate a new predetermined interaction coding or IVR string based on dynamic navigation of the interactive communication system or IVR system and save the new predetermined interaction coding or IVR string to the biller/merchant's database.

In some embodiments, a chatbot may carry out a response module, such as a computer program, to query a database associated with the particular network entity, business, organization, or the like. In some embodiments, the response module can comprise an artificial intelligence program, such as a neural network or the like. In some embodiments, a response module may be dynamically learning and adding information, data, and knowledge to the database such that the range of questions, comments, tasks, and the like that are addressable by the chatbot using the response module increases over time. In some embodiments, conversational exchanges can be carried out to answer a range of questions, such as facts, definitions, how questions, why questions, hypothetical questions, semantically constrained questions, and cross-lingual questions. In addition, an artificial intelligence program used for natural language processing and generating chatbot responses can learn a user's preferences, can build a user-specific profile that can be considered in generating responses for that user, can learn the semantic and linguistic characteristics specific to the user, and/or can catalog the various other chatbots associated with the smart device of the user and/or with third party organizations that are associated with other chatbots to which a communication has been established.

In some embodiments, a chatbot may comprise at least one of a messaging chatbot, an audio chatbot, a visual chatbot, an audio-visual chatbot, a holographic chatbot, an augmented reality chatbot, a virtual reality chatbot, variations thereof, and/or the like. In some embodiments, the chatbot may be configured to receive commands from a user associated with an account, a product, a service, or any other suitable interaction that a user may have with the chatbot.

In some embodiments, security measures may be taken wherein the chatbot, device running the chatbot, or third party system may request a password, pin number, fingerprint, iris scan, facial recognition, vocal print, an associated telephone number, a full or partial social security number, an account number, two-factor authentication via a cell phone, application email, SMS message, public key infrastructure, combinations thereof, or the like before establishing a conversation with the user's device.

In one embodiment, when a user initiates a user session with a smart device, the smart device may call up a chatbot that can initiate and lead a dialogue with the user via the smart device and can use artificial intelligence or the like to determine the intent of the sound waves or audio information. Based upon the intent of the sound waves or audio information, the chatbot may initiate a call with an interactive communication system (e.g., an IVR system of a biller or merchant). In some examples, the smart device may obtain a predetermined interaction coding or interaction map based on the intent and initiate a communication session with the interactive communication system based on the predetermined interaction coding or interaction map. The predetermined interaction coding may define a plurality of conditional parameters for engaging with an interactive communication system.

In some embodiments, the chatbot may be configured to establish a secured connection to a variety of network entities, such as elements of the network 210. In some embodiments, the chatbot may be configured to initiate a communication session or call with an interactive communication system or IVR system of a biller or merchant based on the intent determined from the sound waves or audio information. In some embodiments, the smart device may be a smart speaker, a smartphone, or the like, and can comprise a processor that is configured to carry out a computer process stored on a memory device. In some embodiments, the smart device may cause the processor to initiate a computer program that can establish secure connections with the variety of network entities, such as a company, vendor, organization, or the like. In some embodiments, the smart device or chatbot may access an application programming interface (API) or a data exchange that is configured to retrieve information from one or more databases or network entities. Said another way, the smart device or chatbot may establish a secure connection with a network or database of a particular company or organization to initiate a communication session with a chatbot or a call with an interactive communication system or IVR system in response to interpreting, based on sound waves or audio information, the intent of a request to initiate a communication session or call.

Figure 3:
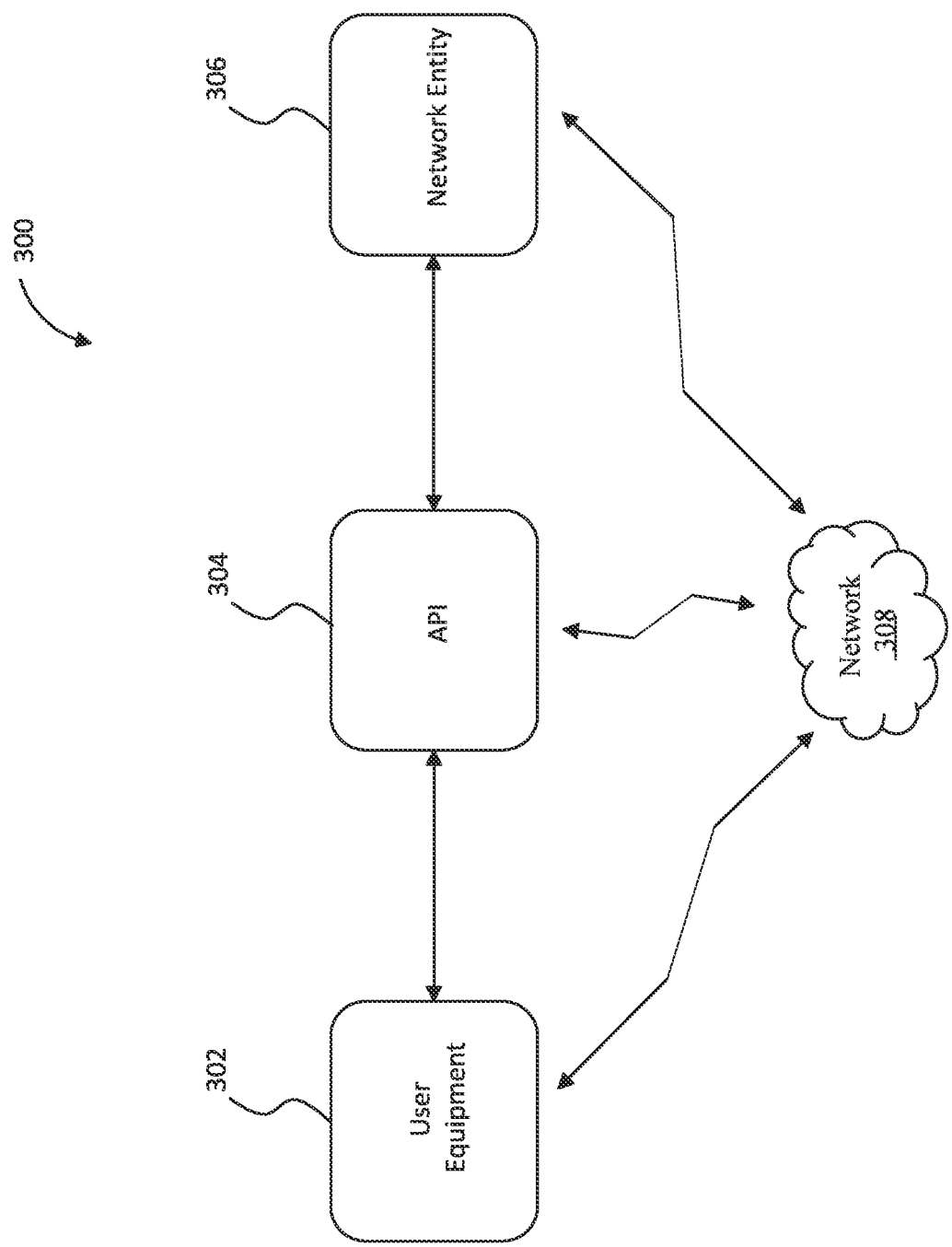
FIG. 3 is a diagram illustrating a system for carrying out one or more aspects of the currently disclosed invention.

In some embodiments, the chatbot can be hosted by or can be used in conjunction with a data exchange API. In some embodiments, the data exchange API can be used to request, transfer, store, recall, exchange, or otherwise handle the user's data and/or data associated with the various other chatbots that are configured for connection with or communication with the smart device or chatbot. For instance, such a system 300 is illustrated in FIG. 3. In some embodiments, user equipment 302 such as the smart device, can be configured to be in communication with an API 304. In some embodiments, the API 304 can be configured to be in communication with one or more network entities 306, such as a network or database of various organizations or businesses. In some embodiments, each of the user equipment 302, API 304, and network entity 306 can be configured to connect to a network 308, such as the Internet, such that communication can be secured and routed along traditional channels of inter-network entity and inter-smart device communication. By way of example only, the network 308 can comprise a distributed mobile network or public land mobile network (PLMN) such that the user equipment 302 (e.g., smart device) can establish an association or connection directly via the network 308 to any of the API 304, network entity 306, and/or the like. Other suitable networks and communications technologies are described elsewhere herein, and other known network types and communication technologies not disclosed herein are also contemplated.

Figure 4:
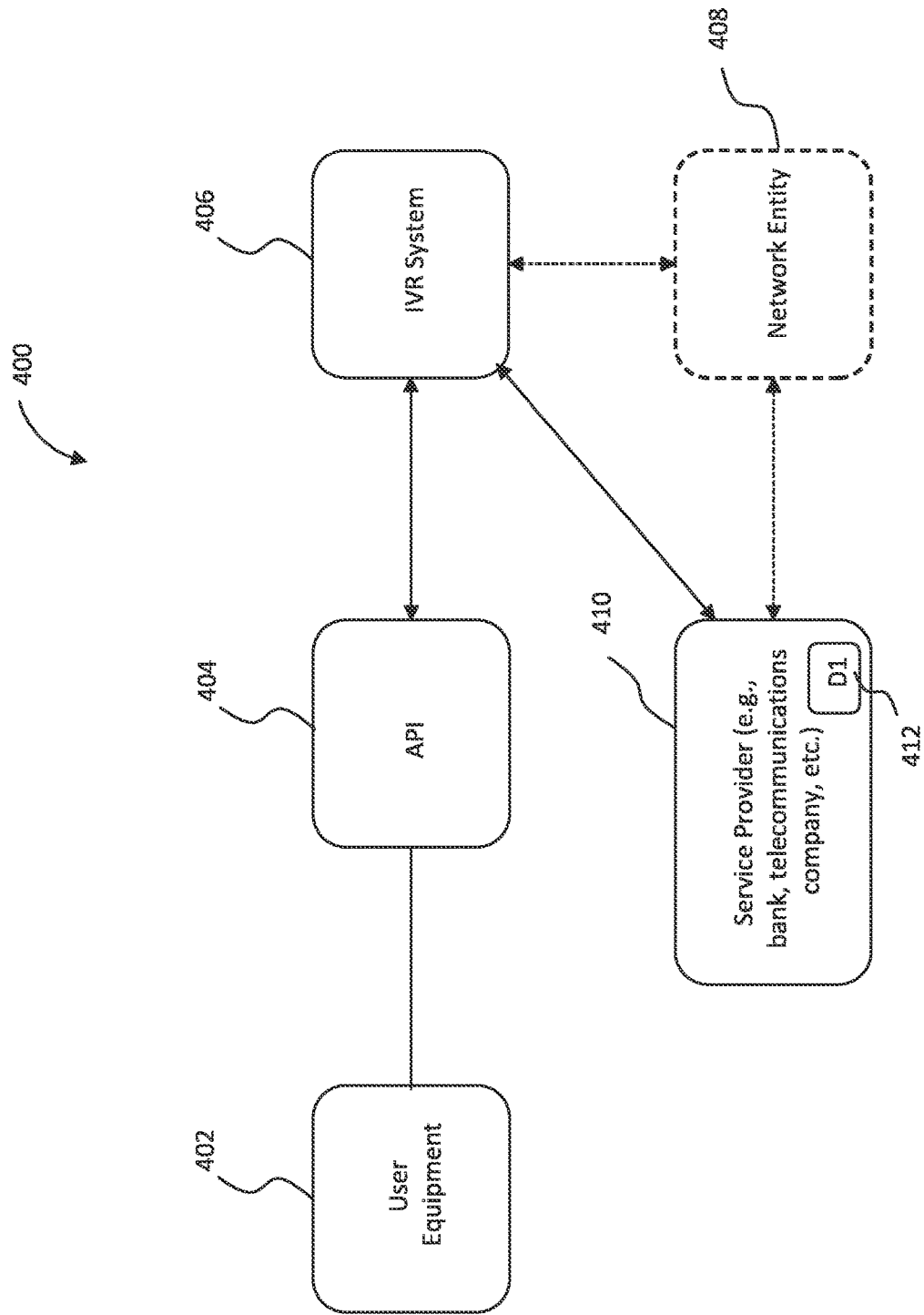
FIG. 4 is a diagram illustrating a system for carrying out one or more aspects of the currently disclosed invention.

Referring now to FIG. 4, a similar automated system 400, using such an API 404, is configured to initiate a call (e.g., as Voice over Internet Protocol communications) between a user equipment 402 (e.g., the smart device or chatbot) and an integrated voice response (IVR) system, such as an IVR system 406 (which may be similar to the IVR systems typically used to provide prompts to a caller that prompt the caller to provide vocal responses to said prompts which can help the IVR system route the caller to a desired destination within the IVR system). Said another way, the user may ask the user equipment 402 (e.g., their smart device) to initiate a call with a particular service provider 410, the user equipment 402 can ask the API 404 to route a VoIP call to the IVR system 406 of the service provider 410, and the IVR system may be in communication with a network or database 412 of the service provider 410. In some instance, the IVR system 406 may not be in direct communication with the service provider 410, but instead may communicate with a network entity 408 that is associated with or in communication with the service provider 410.

By way of example only, a user may ask their smart device to call a bank at which they are a customer to request a transfer of funds from their account to a different account. The smart device may interpret an intent of the user's command based on analysis of the sound waves or audio information (i.e., based on the user's command). In some embodiments, the smart device may request additional information (e.g., authentication information) from the user and the user may provide the requested additional information (e.g., authentication information) to the service provider via the network. Additionally, the smart device may retrieve (e.g., from a database of the bank) a predetermined interaction coding (e.g., IVR string) associated with the biller or merchant. In some embodiments, the predetermined interaction coding or IVR string may be locally stored by the smart device or provided by another computing entity and/or database in electronic communication with the smart device and the service provider. The smart device can then initiate a communication session, such as a VoIP call, with the interactive communication session or IVR system associated with the bank, such as by directing a call to a hotline phone number or a toll-free number pre-determined by the smart device to be associated with the bank. Alternatively, the hotline or toll-free number may be provided at the time of the user's request or in response to a request for the same information by the smart device. In another embodiment, the smart device may not know or have access to a predetermined hotline number or toll-free number associated with the bank and may instead conduct a search for the hotline number or toll-free number, e.g., using the Internet. However, the smart device determines or receives the relevant telephone number or routing address (HTTP address, IP address, or the like) associated with the interactive communication system or IVR system, the smart device can then initiate a communication session or call to that interactive communication system or IVR system. Once the IVR system accepts the call from the smart device (or API, in some instances) the IVR system will provide a series of prompts associated with an interaction map or IVR tree, which can be numerical, tonal, alphabetical, or in any other format, each prompt associated with a particular department, issue, question, user type, or the like. The series of prompts can be presented in a serial manner, meaning that they are presented in a chronological order. In some examples, the IVR system can either present a first prompt and then wait for a binary response (e.g., accept or reject) from the smart device, or conversely the IVR system can present each sequential prompt and leave sufficient time between each prompt such that, when the desired prompt is reached, the smart device is able to convey a single acceptance response. In some embodiments, a call to an IVR system may require multiple prompts before the caller is properly routed to their desired destination with in the IVR system. In such cases, the back-and-forth between the IVR system and the smart device may be carried out without the knowledge of or input from the user to properly route the user's call to the IVR system. As such, the smart device operates to intelligently and dynamically navigate an interactive communication system or IVR system based on the intent of the call. In some embodiments, the smart device may already have access to user-provided information, such as payment information, a user's personally identifying information, or the like, such that the smart device can provide such information if prompted for such information by the interactive communication system or IVR system.

Returning back to the preceding example in which the user asks their smart device to call a bank of which they are a customer, the smart device may thus manage some or all of the IVR routing process in the background without any or minimal input from the user, and then hand off the call to the user if the desired destination or an intent of the call necessitates a human-to-human interaction or if the smart device is not able to provide all of the information required to reach the desired destination within the IVR system. Alternatively, if the smart device cannot provide all the information required by the IVR system to reach the user's desired destination within the IVR system, the smart device may simply ask for input from the user, listen for the input or feedback from the user, and then either relay this information to the IVR system as an audio recording or transfer this audio recording to a textual transcription or other sort of data format before relaying the information to the IVR system. In some embodiments, once the destination is reached within the IVR system, the smart device may hand the call off to the user who can complete the call directly with the IVR system, call center personnel, or the like, by speaking to their smart device. If the user would like to terminate the call, the user may simply instruct the smart device to terminate the call or can depress a button or make another such gesture input to their smart device suitable to communicate that the call should be terminated.

When a user calls an IVR system, especially when the destination is a switchboard, call center, human-response line, or the like, the user may need to wait a period of time before the call can continue. In some embodiments in which the user asks the smart device to initiate a call to an IVR system of a business or organization (e.g., a bank), the smart device may reach the desired destination and detect that the call is on hold or has been queued for some period of time. When a call initiated by and/or handled by the smart device has been queued for later handling or is placed on hold, the smart device can delay handing off the call to the user until a representative picks up the call.

As noted above, the smart device may receive sound waves or audio information (e.g., a prompt or command) from a user indicative of a request to initiate a call. The smart device may interpret, based on the sound waves or audio information, an intent of the call and an identity of the biller or merchant. By way of example only, the smart device may interpret/determine that the intent of the call is to initiate a call with the user's bank in order to transfer funds between accounts. Subsequent to interpreting the intent of the call the smart device may proceed to retrieve an IVR string associated with the biller or merchant based on the intent of the call. An IVR string may be or comprise a sequence of values (e.g., alphanumerical inputs, tones, combinations thereof, and/or the like) associated with a particular path of an interactive mapping such as an IVR tree. By way of example only, an IVR string may be "18001111111<Biller/merchant phone number>, 3<first prompt selection>, 4111XXXXXXXXXXXX<account number>, 1<second prompt selection> . . . "

Subsequent to retrieving the IVR string, the smart device may proceed to initiate the call with the biller or merchant. In some embodiments, the smart device may provide a notification to the user (e.g., via a user device) that the call with the biller or merchant has been initiated. Upon initiation of the call, the biller of merchant may initiate the IVR system/process with the smart device. For example, the IVR system may provide a prompt for the smart device to make a selection between two or more options from an IVR tree (e.g., a level of an IVR tree). By way of example, the IVR system may provide a prompt for the smart device to select (a) commercial banking or (b) retail banking. In return, the smart device can relay a response selecting retail banking (i.e., based on the intent of the call and the IVR string). For example, the smart device may enter or provide one or more tones associated with values from the IVR string. In one example, if the IVR prompt indicates "press '1' for commercial banking and press '2' for retail banking, the smart device may generate an aural response or a tone corresponding with the value '2.' Subsequent to responding to the IVR prompt, the smart device may wait for a second prompt from the IVR system in order to further navigate the IVR tree.

Subsequently, the IVR system may provide a second prompt to navigate a second level of the IVR tree. For example, the IVR system may provide a prompt for the smart device to select (a) check your account balance, (b) report fraudulent activity on your account, (c) open a new account, (d) pay a bill, (e) transfer funds between accounts, (f) initiate a wire transfer, (g) change your contact information, (h) find your nearest banking location or ATM, etc. In response to the IVR system prompt to navigate the second level of the IVR tree, the smart device can relay a selection of option (e) since the user communicated in their original request to the smart device that their intent is to request a transfer of funds from their account to another account. For example, the smart device may provide an aural response or enter one or more tones associated with one or more values for the second level of the IVR tree. In one example, if the IVR prompt indicates "press '5' to transfer funds between accounts", the smart device may generate an aural response or a tone corresponding with the value '5.' As such, the smart device may iteratively, in response to a plurality of IVR prompts (e.g., based on syntactical analysis of the IVR prompt(s)), provide aural or tonal responses in order to dynamically navigate the IVR tree based on the intent of the call.

Figure 5:
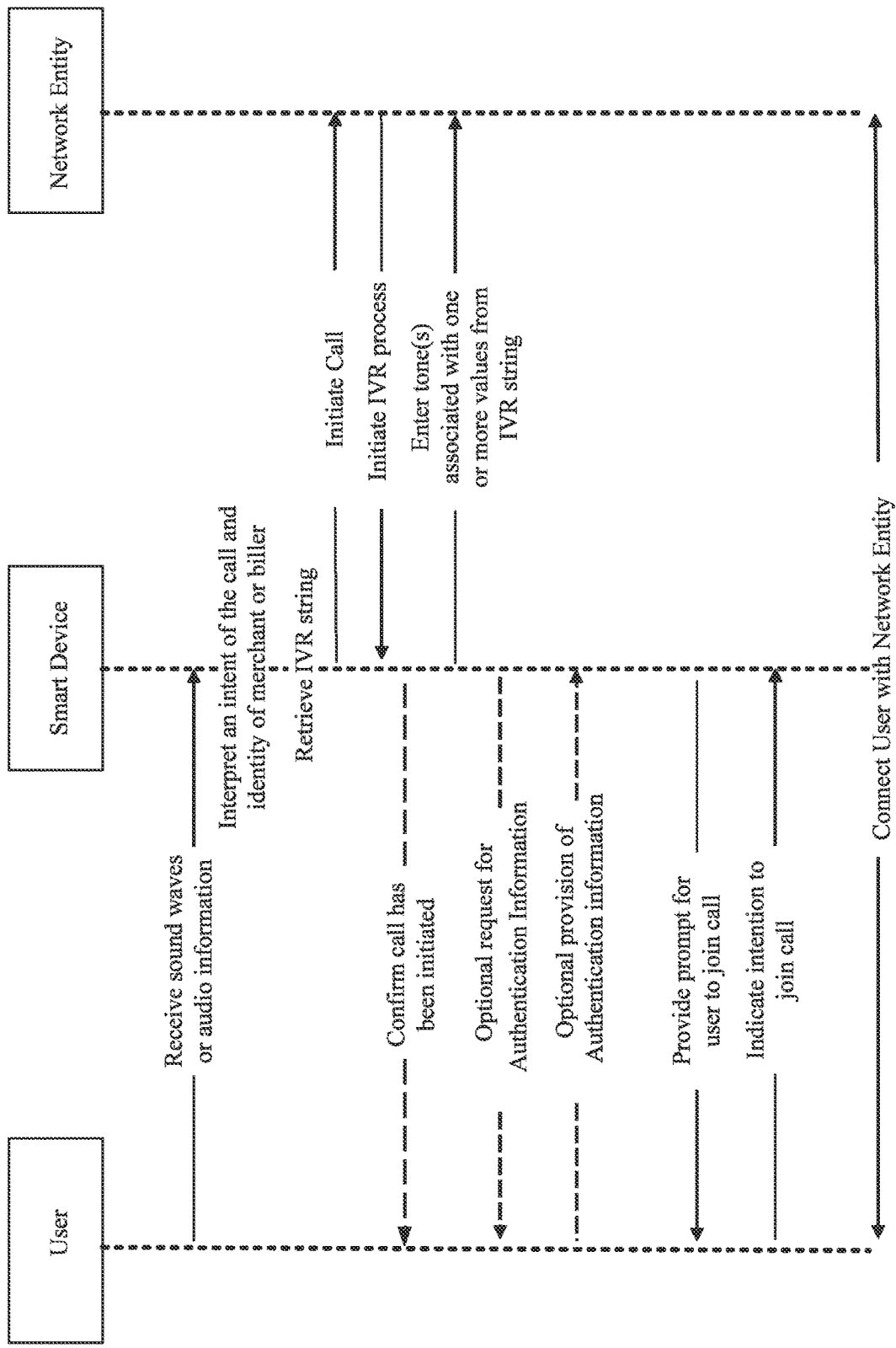
FIG. 5 is a signal diagram illustrating communication between a user device, a smart device/virtual assistant and a network entity by way of a cloud service, according to one or more aspects of the currently disclosed invention.

In some embodiments, if the smart device is uncertain whether to select, for instance, option (e) or option (f) based on a lack of information from the user about whether the transfer of funds is a wire transfer or an electronic funds transfer within the same bank, the smart device may simply pause the IVR system and ask the user for clarification about whether the funds transfer should be electronic or a wire transfer. In some embodiments, the smart device may be configured to determine a probability based upon semantic analysis of the user's initial request or other such inputs to calculate a probability between two or more options from a list of prompts, and may decide to select the option with the highest probability instead of requesting further information from the user or based on other information such as payee routing information or account information. Once the smart device determines the intent of the call and the IVR system receives the selection from the second level of the IVR tree (e), the IVR system might request the funds transfer details (e.g., amount to be transferred, sending account number, receiving account number, routing number, etc.) in an attempt to at least semi-automate the electronic funds transfer process. In some embodiments, the IVR system might first request authentication indicia from the smart device. If the smart device has the authentication indicia readily available, the smart device can provide the authentication indicia and proceed to the IVR system's request for the funds transfer details. In some embodiments, for instance if the user provided some or all of the funds transfer details with the initial request or in a subsequent input, the smart device may provide the available funds transfer details to the IVR system. In an instance in which the smart device does not have access to or already have available some or all of the funds transfer details or authentication indicia, the smart device may request the missing funds transfer details or authentication indicia from the user, and then relay the missing funds transfer details or authentication indicia to the IVR system to proceed with the at least semi-automated funds transfer. If neither the user nor the smart device have access to or know at least one funds transfer detail requested by the IVR system, the smart device might request that the IVR system attempt to find and provide the missing funds transfer detail, or the smart device can escalate the call within the IVR system to reach a human that might be able to look up or provide the missing funds transfer detail. In some embodiments, the smart device may provide a prompt to the user to join the call, based on the intent of the call and/or in an instance in which human interaction is required in order to proceed with the user's request. For example, the smart device may, in an instance in which the IVR system of the biller or merchant is determined to be ready to communicate with the user via the user device or another device, cause presentation of an audio or visual prompt at the user device or other device indicative of a request for the user to join the call. In response, the user may provide an indication (e.g., aural response, gesture, prompt, interaction, or the like) indicating that the user intends to join the call. In one example, the smart device may cause presentation of a selectable object on the user device for the user to indicate his or her intention to join the call by selecting the selectable object. Such an interaction between the user, smart device, and network entity is outlined, according to a particular embodiment, in FIG. 5.

In some embodiments, in an instance in which the IVR string is determined to be incorrect, the smart device may re-initiate the call with the biller or merchant. The smart device can provide an interface where the biller or merchant can update the IVR tree (e.g., which may be stored in a database of the biller or merchant that is accessible by the smart device) in order to modify/update IVR strings, IVR prompts and intents. In some examples, updates may be confirmed through a variety of techniques and method such as by providing an indication to the smart device, sending a confirmation message or email, and/or the like. In some cases, the smart device may amend the IVR string based on dynamic navigation of the IVR tree and save the amended IVR string to the IVR tree. In various examples, the amended IVR string and/or associated IVR tree may be stored locally by the smart device, provided to the biller or merchant IVR database, combinations thereof, and/or the like.

In some embodiments, the smart device may determine that the intent of the call has been fulfilled or is successful. In such examples, the smart device may provide an indication to the user device that the intent of the call has been fulfilled and the method may terminate. By way of example, the smart device may provide an indication or notification to the user device confirming that an email has been successfully sent, a balance on an outstanding bill or statement has been paid, funds have successfully been transferred, or the like. In some cases, the smart device may provide an audio or visual prompt indicative that the intent of the call has been fulfilled, providing requested information, or the like.

In some embodiments, such a dialogue between a user's smart device and an IVR system of, for instance, the user's bank, may require that the user's smart device retrieves information from another IVR system or another business or organization other than the business or organization that hosts and manages the primary IVR system. In such an embodiment, the smart device may initiate a second call, such as a VoIP call, with the secondary IVR system. For instance, continuing with the above embodiment in which the smart device is attempting to automatically transfer funds between accounts by initiating a call to the IVR of the user's bank, the other account to which the user is transferring funds may be a user's account at another bank, another payee account at the same bank, or an account at a different type of organization or financial institution that is not a bank. In such a circumstance, if the smart device does not know the account details of the other account at the other bank, the smart device may initiate a parallel call to the IVR system of the other bank to retrieve the relevant missing account details associated with the other account at the other bank.

In some embodiments, context information (such as information about the reason for the call, the type of caller, the account type, the user identification number, and/or the like) can be relayed to the IVR system at the outset of a call so as to transfer the call directly to a particular point within the IVR call tree (which is the structure of the IVR system through which the IVR system prompts callers to reach their desired destination). For instance, in the context of this disclosure, the smart device may convey the context information to the IVR system to indicate to the IVR system a particular point down the call tree to which to transfer the call. In some embodiments, the smart device may store information related to past similar calls such that when the user instructs the smart device to make such a call in the future to the same IVR system, the smart device can remember the structure of the call tree and at least attempt to jump to some lower point or level in the call tree to avoid the required back and forth between the IVR system and the smart device.

In some embodiments, a user may ask their smart device to initiate a call to an IVR system, and then subsequently determine that they need to leave the location of their smart device or otherwise may become unreachable. By way of example only, a smart device may be a smart home device, such as the Amazon® Alexa device, that is not a mobile device but is rather configured to remain in a relatively fixed location during use (e.g., may require a direct power connection to a power outlet of the user's home). In such embodiments, the user may need to leave their home after having asked their smart device to initiate the call to the IVR system. As such, in response to the user indicating that they need to leave during the call to the IVR system, the smart device may work in the background, and after the user leaves can be configured to forward the call to another user device (such as a cell phone, smart phone, land line, or the like) based upon contemporaneous user instructions or standing user preferences. By doing so, the smart device can wait until the call has reached the desired destination and then forward the call to the user's other device so the user can be connected to the IVR system to finalize the call. Likewise, the smart device may carry out the call and navigate the IVR system call tree without user input, and then if user input is required at some point during the call, the smart device may reach out to the user via their other device to receive the further input needed by the user to complete the call to the IVR system. Continuing the example from above in which the user has requested the smart device to initiate a funds transfer from an account at their bank, the smart device may initiate the call, carry out most of the call without user input, and then reach a point at which the user's authentication indicia are needed, and can then call the user on their cell phone to carry out a vocal print or so the user can input their pin using the touch-tone keypad, or can prompt the user to provide their fingerprint by pushing a request through an application stored on their smartphone, or by any other suitable means.

Figure 6:
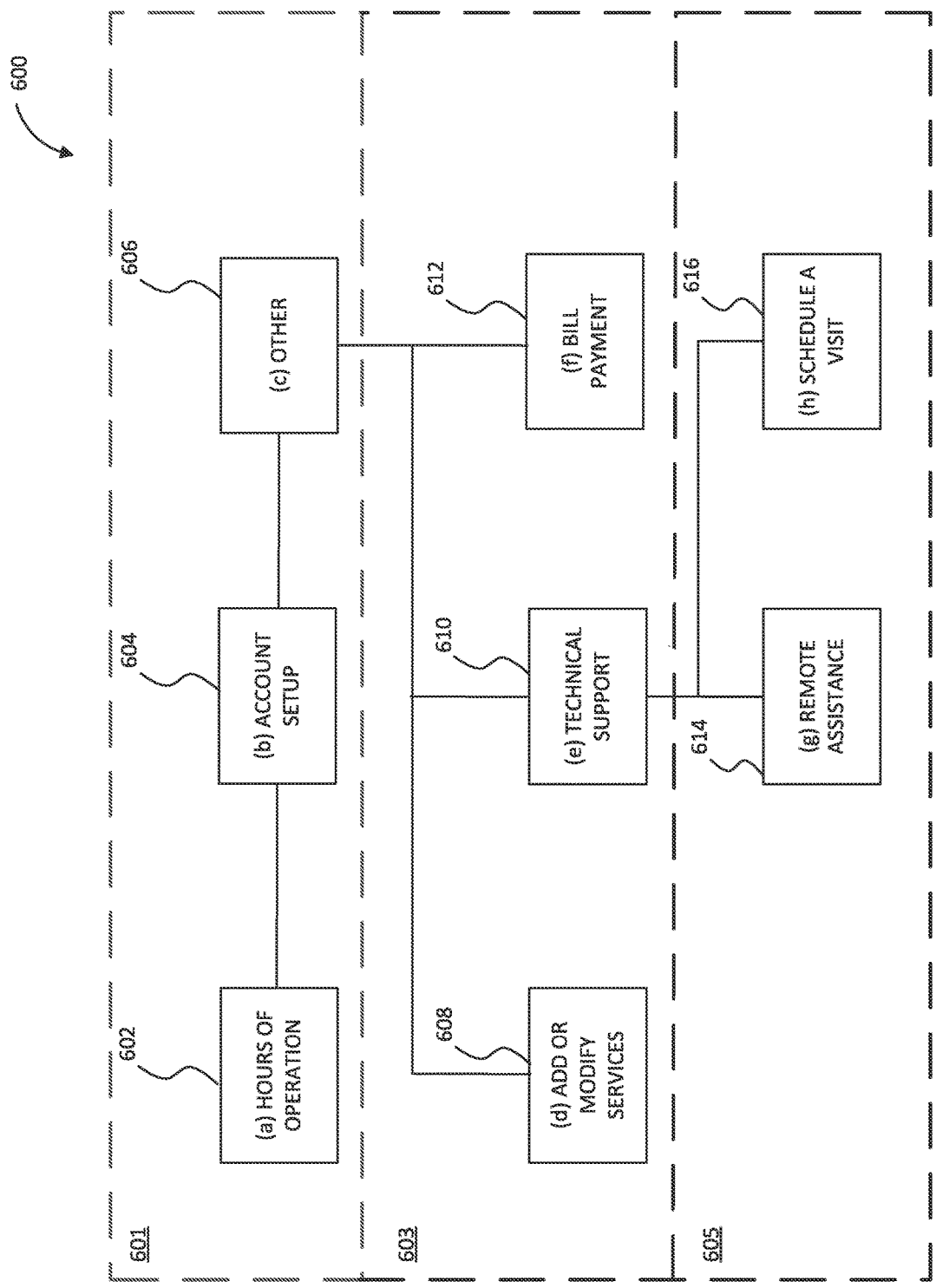
FIG. 6 is a schematic diagram illustrating an IVR tree, according to one or more aspects of the currently disclosed invention.

Referring now to FIG. 6, a schematic diagram illustrating an IVR tree 600 of an IVR system is provided. The IVR tree 600 may be or comprise a data object describing an architecture or layout of an IVR system. In some embodiments, the IVR tree 600 may be a data object stored in a database of a biller or merchant. In various examples, the IVR tree 600 may be accessed by a smart device, virtual assistant, chatbot or the like. For example, the smart device may be in operable communication with a database of a biller or merchant and may retrieve/request or otherwise access an IVR tree 600 associated with the biller or merchant. As depicted in FIG. 6, the IVR tree 600 may comprise a plurality of levels. As shown, the IVR tree 600 comprises a first level 601, a second level 603 and a third level 605. By way of example, a smart device may initiate a call with the IVR system of a biller or merchant. Subsequent to initiating the call with the IVR system of the biller or merchant, the smart device may receive a first IVR prompt associated with the first level of the IVR tree 600. For example, the smart device may receive a first IVR prompt providing options for navigating to another level of the IVR tree 600. For example, the first IVR prompt may indicate that the smart device can select (a) hours of operation 602, (b) account setup 604 or (c) other 606. In response to the first IVR prompt, the smart device may (in some examples, based on syntactical analysis of the IVR prompt) provide an aural or tonal response corresponding with one of the provided options based on the intent of the call. For example, the smart device may enter one or more tones corresponding with (c) other 606, based on the intent of the call. In response to the tone(s) provided/entered by the smart device, the IVR system may navigate to the second level 603 of the IVR tree 600 and provide a second IVR prompt corresponding with the second level 603 of the IVR tree 600. For example, the second IVR prompt may indicate that the smart device can select (d) add or modify services 608, (e) technical support 610 or (f) bill payment 612. In response to the second IVR prompt, the smart device may (in some examples, based on syntactical analysis of the IVR prompt) provide an aural or tonal response corresponding with one of the provided options based on the intent of the call. For example, the smart device may enter one or more tones corresponding with (d) add or modify services 608, or (e) technical support 610, based on the intent of the call. In response to the aural response or tone(s) provided/entered by the smart device, the IVR system may, in some examples, take a particular action, provide information requested, connect the smart device to a human agent and/or the like. In some cases, the IVR system may navigate to the third level 605 of the IVR tree 600 or return to the first level 601 of the IVR tree based on the aural response or tone(s) provided by the smart device. In an instance in which the smart device enters or provides an aural response or tone(s) corresponding with (e) technical support 610, the IVR system may navigate to the third level 605 of the IVR tree 600 and provide a third IVR prompt corresponding with the third level of the IVR tree. For example, the third IVR prompt may indicate that the smart device can select (g) remote assistance 614 or (h) schedule a visit 616. In response to the third IVR prompt, the smart device may (in some examples, based on syntactical analysis of the IVR prompt) provide an aural or tonal response corresponding with one of the provided options based on the intent of the call. For example if the intent of the call is to obtain remote assistance, the smart device may enter one or more tones corresponding with (g) remote assistance 614. In some examples, the smart device can determine that the IVR system (or other communication system) is ready to communicate with a user via a user device or another user device. In such examples, the smart device can cause presentation of an audio or visual prompt at the user device or the other user device indicative of a request for the user to join the call or communication session, such as by providing a response, contact, gesture, interaction and/or the like indicating that the user intends to join the call. Subsequently, the smart device may cause the user device or other device to allow the user to join the call or communication session between the smart device and the IVR system (or other communication system) of the biller or merchant.

While the above example is described in the context of an IVR system, the present disclosure is not limited to such embodiments. In various examples, the smart device may be configured to dynamically navigate other types of interactive communication systems and communication sessions including, but not limited to, conversational-based systems, textual based communication systems (e.g., via a chatbot) or the like. For example, the smart device may dynamically navigate a communication system of a biller or merchant based on an interaction map that is different from an IVR tree. An example interaction map may comprise predetermined interaction coding defining predetermined textual or aural responses to prompts received from the communication system of the biller or merchant. The smart device may, in some cases, update or modify an IVR tree or interaction map based on a particular communication session. In some examples, the smart device can update or modify an interaction mapping string associated with an interaction map stored in a database (e.g., a database of the biller or merchant). For example, the smart device may determine that an IVR string that was returned is incorrect and initiate modification of the IVR string.

Figure 7:
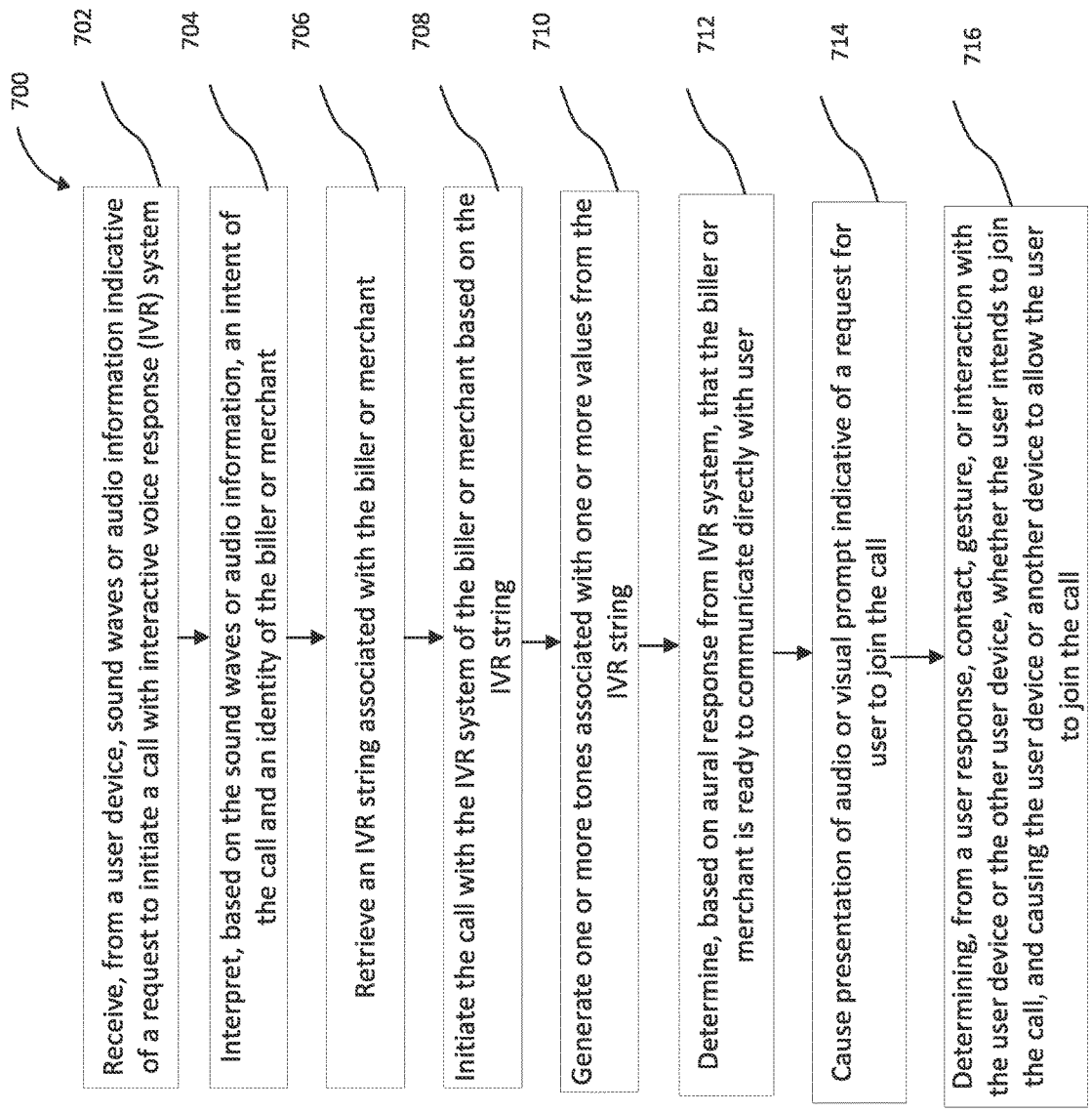
FIG. 7 is a block flow diagram of a method for dynamically navigating an interactive communication system, according to a particular embodiment of the present invention.

Referring now to FIG. 7, a method 700 is provided for dynamically navigating and interactive communication system (e.g., by a smart device). In some embodiments, the method comprises receiving, from a user device, sound waves or audio information, the sound waves or audio information indicative of a request to initiate a call with an interactive voice response (IVR) system of a biller or merchant, at 702. In some embodiments, the method further comprises interpreting, based on the sound waves or audio information, an intent of the call and an identity of the biller or merchant, at 704. In some embodiments, the method further comprises retrieving an IVR string associated with the biller or merchant, at 706. In some embodiments, the method further comprises initiating the call with the IVR system of the biller or merchant based on the IVR string, at 708. In some embodiments, the method further comprises generating one or more tones associated with one or more values from the IVR string, at 710. In some embodiments, the method further comprises determining, based on an aural response from the IVR system of the biller or merchant, that the biller or merchant is ready to communicate directly with a user of the user device, at 712. In some embodiments, the method further comprises causing presentation of an audio or visual prompt (e.g., at the user device or another user device) indicative of a request for the user to join the call, at 714. In some embodiments, the method further comprises determining, from a user response, contact, gesture, or interaction with the user device or the other user device, whether the user intends to join the call, and in an instance in which it is determined that the user intends to join the call, causing the user device or the another user device to allow the user to join the call, at 716.

In some embodiments, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Methods, apparatuses, and systems are therefore provided in accordance with example embodiments to provide, for example, for dynamically navigating interactive communication systems interactive transactions using virtual assistants, conversational artificial intelligence, and/or chatbots.

According to a first embodiment, a method is provided. The method can comprise receiving, from a user device, sound waves or audio information, the sound waves or audio information indicative of a request to initiate an interactive communication session with a communication system of a biller or merchant; interpreting, based on the sound waves or audio information, an intent of the communication session and an identity of the biller or merchant; retrieving a predetermined interaction coding associated with the biller or merchant; and initiating the interactive communication session with the communication system of the biller or merchant based on the predetermined interaction coding.

In some embodiments, the method can further comprise retrieving, from a database of biller or merchant interaction coding information, based on the intent of the communication session and the identity of the biller or merchant, the predetermined interaction coding associated with the biller or merchant.

In some embodiments, the method can further comprise retrieving an interaction map associated with the biller or merchant; and determining, from the interaction map, based on the intent of the communication session, the predetermined interaction coding.

In some embodiments, the method can further comprise generating, based on the predetermined interaction coding, one or more tones associated with one or more values from the predetermined interaction coding; and determining, based on an aural response from the interactive communication system of the biller or merchant, that the biller or merchant is ready to communicate directly with a user of the user device.

In some embodiments, the method can further comprise providing, to the user via the user device, a notification that the interactive communication session with the biller or merchant has been initiated.

In some embodiments, the method can further comprise, in an instance in which the interactive communication system of the biller or merchant is determined to be ready to communicate with a user via the user device or another user device, causing presentation of an audio or visual prompt at the user device or the another user device indicative of a request for the user to join the communication session; determining, from a user response, contact, gesture, or interaction with the user device or the other user device, whether the user intends to join the interactive communication session; and in an instance in which it is determined that the user intends to join the interactive communication session, causing the user device or the another user device to allow the user to join the interactive communication session between the user device and the interactive communication system of the biller or merchant.

In some embodiments, the method can further comprise receiving a prompt, and, based on a syntactical analysis of the prompt, providing a tonal or aural response to the prompt to navigate the interactive communication system based on the intent.

In some embodiments, the method can further comprise providing an interface where the biller or merchant can update and add to the interaction map, where the update and addition can apply to, but not be limited to, predetermined interaction codings, prompts and intents; and confirming that the update and addition is successful to the merchant or biller through a confirmation message, wherein one possible embodiment is a confirmation email.

In some embodiments, the method can further comprise, in an instance in which the biller or merchant is determined to not be ready to communicate with the user, determining that the predetermined interaction coding is wrong and initiating a second call with the biller or merchant; dynamically navigating, based on the intent, the interaction map of the biller or merchant; amending the predetermined interaction coding based on dynamic navigation of the interaction map; and saving the amended predetermined interaction coding to the interaction map.

In some embodiments, the method can further comprise, in an instance in which the biller of merchant is determined to not be ready to communicate with the user, determining that there is not an predetermined interaction coding that is stored in the database associated with the biller/merchant OR that all predetermined interaction codings stored in the database and associated with the biller/merchant are assigned to other intents that are different and distinct from the intent of the communication session; dynamically navigating, based on the intent, the interactive communication system of the biller/merchant; generating a new predetermined interaction coding based on dynamic navigation of interactive communication system; and saving the new predetermined interaction coding to the biller/merchant's database.

In some embodiments, the method can further comprise providing, based on the predetermined interaction coding, an aural response associated with values from the predetermined interaction coding; and determining, based on a response from the interactive communication system of the biller or merchant, that an action based on the intent is successful.

According to a second embodiment, a system for dynamically navigating an interactive communication system is provided. The system can comprise a computing device comprising at least one processor, a user device, and an external computing device, the system configured to: receive, by the computing device from the user device, sound waves or audio information, the sound waves or audio information indicative of a request to initiate a communication session with a communication system of a biller or merchant; transmit, by the computing device, the sound waves or audio information to the external computing device; determine, by the external computing device, an intent of the call and the identity of the merchant or biller based on interpreting the sound waves or audio information; retrieve, by the external computing device an interaction mapping string associated with the intent of the call; transmit, by the external computing device, the interaction mapping string to the computing device; receive, by the computing device, the interaction mapping string; and initiate, by the computing device, the communication session with the communication system of the biller or merchant based on the interaction mapping string.

In some embodiments, the computing device is further configured to dynamically communicate with the communication system of the biller or merchant based on the interaction mapping string.

In some embodiments, at least one of the computing device, the user device and the external computing device comprises one or more chatbots.

In some embodiments, the computing device is further configured to: determine that the communication system is ready to communicate with a user of the user device or another user device; cause presentation of an audio or visual prompt at the user device or another user device indicative of a request for the user to join the communication session; and in an instance in which it is determined that the user intends to join the communication session, causing the user device or the another user device to allow the user to join the call between the user device and the communication system of the biller or merchant.

In some embodiments, the interactive mapping string comprises a predetermined interaction coding defining predetermined textual or aural responses to prompts received from the communication system of the biller or merchant.

In some embodiments, the computing device is further configured to update or modify the interaction mapping string based on the communication session.

In some embodiments, the computing device is further configured to update or modify the interaction mapping string by updating a database associated with the biller or merchant.

According to a third embodiment, a method is provided. In some embodiments, the method can comprise receiving, from a user device, sound waves or audio information, the sound waves or audio information indicative of a request to initiate a call with an interactive voice response (IVR) system of a biller or merchant; interpreting, based on the sound waves or audio information, an intent of the call and an identity of the biller or merchant; retrieving an IVR string associated with the biller or merchant; and initiating the call with the IVR system of the biller or merchant based on the IVR string.

In some embodiments, the method can further comprise retrieving, from a database of biller or merchant IVR information, based on the intent of the call and the identity of the biller or merchant, the IVR string associated with the biller or merchant.

In some embodiments, the method can further comprise retrieving an IVR tree associated with the biller or merchant; and determining, from the IVR tree, based on the intent of the call, the IVR string.

In some embodiments, the method can further comprise generating, based on the IVR string, one or more tones associated with one or more values from the IVR string; and determining, based on an aural response from the IVR system of the biller or merchant, that the biller or merchant is ready to communicate directly with a user of the user device.

In some embodiments, the method can further comprise providing, to the user via the user device, a notification that the call with the biller or merchant has been initiated.

In some embodiments, the method can further comprise, in an instance in which the IVR system of the biller or merchant is determined to be ready to communicate with a user via the user device or another user device, causing presentation of an audio or visual prompt at the user device or the another user device indicative of a request for the user to join the call; and determining, from a user response, contact, gesture, or interaction with the user device or the other user device, whether the user intends to join the call; and in an instance in which it is determined that the user intends to join the call, causing the user device or the another user device to allow the user to join the call between the user device and the IVR system of the biller or merchant.

In some embodiments, the method can further comprise receiving an IVR prompt, and, based on a syntactical analysis of the IVR prompt, providing a tonal or aural response to the IVR prompt to navigate the IVR system based on the intent.

In some embodiments, the method can further comprise providing an interface where the biller or merchant can update and add to the IVR tree, where the update and addition can apply to, but not be limited to, IVR strings, IVR prompts and intents; and confirming that the update and addition is successful to the merchant or biller through a confirmation message, wherein one possible embodiment is a confirmation email.

In some embodiments, the method can further comprise, in an instance in which the biller or merchant is determined to not be ready to communicate with the user, determining that the IVR string is wrong and initiating a second call with the biller or merchant; dynamically navigating, based on the intent, the IVR tree of the biller or merchant; amending the IVR string based on dynamic navigation of the IVR tree; and saving the amended IVR string to the IVR tree.

In some embodiments, the method can further comprise in an instance in which the biller of merchant is determined to not be ready to communicate with the user, determining that there is not an IVR string that is stored in the database associated with the biller/merchant OR that all IVR strings stored in the database and associated with the biller/merchant are assigned to other intents that are different and distinct from the intent of the call; dynamically navigating, based on the intent, the IVR system of the biller/merchant; generating a new IVR string based on dynamic navigation of IVR system; and saving the new IVR string to the biller/merchant's IVR database.

In some embodiments, the method can further comprise entering, based on the IVR string, a plurality of tones associated with values from the IVR string; and determining, based on an aural response from the IVR system of the biller or merchant, that an action based on the intent is successful.

According to a fourth embodiment, another method is provided. The method can comprise receiving, at a user device, sound waves or audio information, the sound waves or audio information indicative of a request to initiate a call with an interactive voice response (IVR) system of a biller or merchant; transmitting the sound waves or audio information to an external computing device, the external computing device configured to interpret, from the sound waves or audio information, an intent of the call and an identity of the biller or merchant; receiving, from the external computing device, an IVR string associated with an IVR system of the biller or merchant; and initiating the call with the IVR system of the biller or merchant based on the IVR string.

In some embodiments, the IVR string associated with the biller or merchant can be stored in a biller or merchant IVR database.

In some embodiments, the method can further comprise retrieving, an IVR system mapping or an IVR tree associated with the IVR system of the biller or merchant; and determining, from the IVR system mapping or IVR tree, based on the intent of the call, an IVR string.

In some embodiments, the method can further comprise generating, based on the IVR string, one or more tones associated with one or more values from the IVR string; and determining, based on an aural response from the IVR system of the biller or merchant, that the biller or merchant is ready to communicate directly with a user of the user device.

In some embodiments, the method can further comprise providing, to the user via the user device, a notification that the call with the biller or merchant has been initiated.

In some embodiments, the method can further comprise, in an instance in which the IVR system of the biller or merchant is determined to be ready to communicate with a user via the user device or another user device, causing presentation of an audio or visual prompt at the user device or the another user device indicative of a request for the user to join the call; determining, from a user response, contact, gesture, or interaction with the user device or the other user device, whether the user intends to join the call; and in an instance in which it is determined that the user intends to join the call, causing the user device or the another user device to allow the user to join the call between the user device and the IVR system of the biller or merchant.

In some embodiments, the method can further comprise receiving an IVR prompt, and, based on a syntactical analysis of the IVR prompt, providing a tonal response to the IVR prompt to navigate the IVR tree based on the intent.

In some embodiments, the method can further comprise providing an interface where the biller or merchant can update and add to the IVR tree, where the update and addition can apply to, but not be limited to, IVR strings, IVR prompts and intents; and confirming that the update and addition is successful to the biller or merchant through a confirmation message, wherein one possible embodiment is a confirmation email.

In some embodiments, the method can further comprise in an instance in which the biller or merchant is determined to not be ready to communicate with a user, determining that the IVR string is wrong and initiating a second call with biller or merchant; dynamically navigating, based on intent, the IVR tree of the biller or merchant; amending the IVR string based on dynamic navigation of the IVR tree; and saving the amended IVR string to the IVR tree.

In some embodiments, the method can further comprise in an instance in which the biller of merchant is determined to not be ready to communicate with the user, determining that there is not an IVR string that is stored in the database associated with the biller/merchant OR that all IVR strings stored in the database and associated with the biller/merchant are assigned to other intents that are different and distinct from the intent of the call; dynamically navigating, based on the intent, the IVR system of the biller/merchant; generating a new IVR string based on dynamic navigation of IVR system; and saving the new IVR string to the biller/merchant's IVR database.

In some embodiments, the method can further comprise entering, based on the IVR string, a plurality of tones associated with values from the IVR string; and determining, based on an aural response from the IVR system of the biller or merchant, that an action based on the intent is successful.

According to a fifth embodiment, an apparatus is provided that comprises a processor and a memory storing program code. The memory and the program code can be configured, with the processor, at least to receive, at a user device, sound waves or audio information, the sound waves or audio information indicative of a request to initiate a call with an interactive voice response (IVR) system of a biller or merchant; interpret, based on the sound waves or audio information, an intent of the call and an identity of the biller or merchant; retrieve an IVR string associated with the biller or merchant; and initiate the call with the IVR system of the biller or merchant based on the IVR string.

In some embodiments, the at least one processor can be further configured, with said memory storing program code, at least to retrieve, from a database of biller or merchant IVR information, based on the intent of the call and the identity of the biller or merchant, the IVR string associated with the biller or merchant.

In some embodiments, the at least one processor can be further configured, with said memory storing program code, at least to retrieve, an IVR tree associated with the biller or merchant; and determine, from the IVR tree, based on the intent of the call, an IVR string.

In some embodiments, the at least one processor can be further configured, with said memory storing program code, at least to enter, based on the IVR string, one or more tones associated with one or more values from the IVR string; and determine, based on an aural response from the IVR system of the biller or merchant, that the biller or merchant is ready to communicate directly with a user of the user device.

In some embodiments, the at least one processor can be further configured, with said memory storing program code, at least to provide, to the user via the user device, a notification that the call with the IVR system of the biller or merchant has been initiated.

In some embodiments, the at least one processor can be further configured, with said memory storing program code, at least to, in an instance in which the IVR system of the biller or merchant is determined to be ready to communicate with a user via the user device or another user device, cause presentation of an audio or visual prompt at the user device or the another user device indicative of a request for the user to join the call; determine, from a user response, contact, gesture, or interaction with the user device or the other user device, whether the user intends to join the call; and in an instance in which it is determined that the user intends to join the call, cause the user device or the another user device to allow the user to join the call between the user device and the IVR system of the biller or merchant.

In some embodiments, the at least one processor can be further configured, with said memory storing program code, at least to receive an IVR prompt, and, based on a syntactical analysis of the IVR prompt, providing a tonal response to the IVR prompt to navigate the IVR tree based on the intent.

In some embodiments, the at least one processor can be further configured, with said memory storing program code, at least to provide an interface where the biller or merchant can update and add to the IVR tree, where the update and addition can apply to, but not be limited to, IVR strings, IVR prompts and intents; and confirm that the update and addition is successful to the biller through a confirmation message, wherein one possible embodiment is a confirmation email.

In some embodiments, the at least one processor can be further configured, with said memory storing program code, at least to, in an instance in which the biller or merchant is determined to not be ready to communicate with a user, determine that the IVR string is wrong and initiate a second call with biller/merchant; dynamically navigate, based on intent, the IVR tree of the biller or merchant; amend the IVR string based on dynamic navigation of the IVR tree; and save the amended IVR string to the IVR tree.

In some embodiments, the at least one processor can be further configured, with said memory storing program code, at least to, in an instance in which the biller of merchant is determined to not be ready to communicate with the user, determine that there is not an IVR string that is stored in the database associated with the biller/merchant OR that all IVR strings stored in the database and associated with the biller/merchant are assigned to other intents that are different and distinct from the intent of the call; dynamically navigate, based on the intent, the IVR system of the biller/merchant; generate a new IVR string based on dynamic navigation of IVR system; and save the new IVR string to the biller/merchant's IVR database.

In some embodiments, the at least one processor can be further configured, with said memory storing program code, at least to enter, based on the IVR string, a plurality of tones associated with values from the IVR string; and determine, based on an aural response from the IVR system of the biller or merchant, that an action based on the intent is successful.

According to a sixth embodiment, an apparatus is provided that comprises a processor and a memory storing program code. The memory and the program code can be configured, with the processor, at least to receive, at a user device, sound waves or audio information, the sound waves or audio information indicative of a request to initiate a call with an interactive voice response (IVR) system of a biller or merchant; transmit the sound waves or audio information to an external computing device, the external computing device configured to interpret, from the sound waves or audio information, an intent of the call and an identity of the biller or merchant; receive, from the external computing device, an IVR string associated with the IVR system of the biller or merchant; and initiate the call with an IVR system of the biller or merchant based on the IVR string.

In some embodiments, the at least one processor can be further configured, with said memory storing program code, at least to retrieve, a IVR system mapping or an IVR tree associated with the IVR system of the biller or merchant; and determine, from the IVR system mapping or IVR tree, based on the intent of the call, an IVR string.

In some embodiments, the at least one processor can be further configured, with said memory storing program code, at least to enter, based on the IVR string, one or more tones associated with one or more values from the IVR string; and determine, based on an aural response from the IVR system of the biller or merchant, that the biller or merchant is ready to communicate directly with a user of the user device.

In some embodiments, the at least one processor can be further configured, with said memory storing program code, at least to provide, to a user via the user device, a notification that the call with the biller or merchant has been initiated.

In some embodiments, the at least one processor can be further configured, with said memory storing program code, at least to, in an instance in which the IVR system of the biller or merchant is determined to be ready to communicate with a user via the user device or another user device, cause presentation of an audio or visual prompt at the user device or the another user device indicative of a request for the user to join the call; determine, from a user response, contact, gesture, or interaction with the user device or the other user device, whether the user intends to join the call; and in an instance in which it is determined that the user intends to join the call, cause the user device or the another user device to allow the user to join the call between the user device and the IVR system of the biller or merchant.

In some embodiments, the at least one processor can be further configured, with said memory storing program code, at least to receive an IVR prompt, and, based on a syntactical analysis of the IVR prompt, provide a tonal response to the IVR prompt to navigate the IVR tree based on the intent.

In some embodiments, the at least one processor can be further configured, with said memory storing program code, at least to provide an interface where the biller or merchant can update and add to the IVR tree, where the update and addition can apply to, but not be limited to, IVR strings, IVR prompts and intents; and confirm that the update and addition is successful to the biller through a confirmation message, wherein one possible embodiment is a confirmation email.

In some embodiments, the at least one processor can be further configured, with said memory storing program code, at least to, in an instance in which the biller or merchant is determined to not be ready to communicate with a user, determine that the IVR string is wrong and initiate a second call with biller/merchant; dynamically navigate, based on intent, the IVR tree of the biller/merchant; amend the IVR string based on dynamic navigation of the IVR tree; and save amended IVR string to the IVR tree.

In some embodiments, the at least one processor can be further configured, with said memory storing program code, at least to, in an instance in which the biller of merchant is determined to not be ready to communicate with the user, determine that there is not an IVR string that is stored in the database associated with the biller/merchant OR that all IVR strings stored in the database and associated with the biller/merchant are assigned to other intents that are different and distinct from the intent of the call; dynamically navigate, based on the intent, the IVR system of the biller/merchant; generate a new IVR string based on dynamic navigation of the IVR system; and save the new IVR string to the biller/merchant's IVR database.

In some embodiments, the at least one processor can be further configured, with said memory storing program code, at least to enter, based on the IVR string, a plurality of tones associated with values from the IVR string; and determine, based on an aural response from the IVR system of the biller or merchant, that an action based on the intent is successful.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed, and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

To provide an overall understanding, certain illustrative embodiments have been described; however, it will be understood by one of ordinary skill in the art that systems, apparatuses, and methods described herein can be adapted and modified to provide systems, apparatuses, and methods for other suitable applications and that other additions and modifications can be made without departing from the scope of systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the fields of telecommunications, IoT devices, payment servicing, artificial intelligence, and machine learning have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and/or the like are used merely as labels, and are not intended to impose numerical requirements or any relative order of operations or organization on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. An apparatus comprising:
   at least one processor; and
   at least one memory storing instructions thereon that, when executed by the at least one processor, cause the apparatus to perform at least:
      initiating, for a user, an interactive communication session with a communication system of a biller or merchant;
      determining, based at least in part on an analysis of communications by the user with the communication system of the biller or merchant, at least one user intent associated with the interactive communication session;
      retrieving an interaction map associated with the communication system of the biller or merchant;
      determining, based on at least the interaction map and the at least one user intent, one or more interaction destinations within the interaction map, the one or more interaction destinations being associated with the at least one user intent for the interactive communication session with the communication system of the biller or merchant;
      transmitting a connection request towards a network entity associated with the biller or merchant, the connection request comprising an indication of the one or more interaction destinations, the indication comprising at least one predetermined interaction coding associated with the one or more interaction destinations, the predetermined interaction coding comprising an initial interaction destination within the interaction map and an optimal pathway for navigating the interaction map to reach the initial interaction destination within the interaction map; and
      initiating or continuing the interactive communication session with the communication system of the biller or merchant based using the one or more interaction destinations and the at least one user intent for the interactive communication session.

2. The apparatus of claim 1, wherein the predetermined interaction coding further defines a plurality of conditional parameters for engaging with the communication system.

3. The apparatus of claim 1, wherein initiating the interactive communication session comprises initiating a chatbot stored on a user device or a remote device.

4. The apparatus of claim 3, wherein the instructions stored on the at least one memory, when executed by the at least one processor, further cause the apparatus to perform at least:
generating at least one textual response or audio response based at least in part on the user intent and the aural request; and
communicating, using the chatbot, with the network entity of the biller or merchant using the at least one textual response or audio response.

5. The apparatus of claim 4, wherein the instructions stored on the at least one memory, when executed by the at least one processor, further cause the apparatus to perform at least:
retrieving, from a remote database, user account information associated with the biller or merchant; and
communicating with the network entity based at least in part on the user account information.

6. The apparatus of claim 4, wherein the instructions stored on the at least one memory, when executed by the at least one processor, further cause the apparatus to perform at least:
generating a user profile comprising user-specific preferences for the user; and
storing user information associated with the interactive communication session.

7. The apparatus of claim 4, wherein the chatbot comprises a neural network machine learning model.

8. A method comprising:
initiating, for a user, an interactive communication session with a communication system of a biller or merchant;
determining, based at least in part on an analysis of communications by the user with the communication system of the biller or merchant, at least one user intent associated with the interactive communication session;
retrieving an interaction map associated with the communication system of the biller or merchant;
determining, based on at least the interaction map and the at least one user intent, one or more interaction destinations within the interaction map, the one or more interaction destinations being associated with the at least one user intent for the interactive communication session with the communication system of the biller or merchant;
transmitting a connection request towards a network entity associated with the biller or merchant, the connection request comprising an indication of the one or more interaction destinations, the indication comprising at least one predetermined interaction coding associated with the one or more interaction destinations, the predetermined interaction coding comprising an initial interaction destination within the interaction map and an optimal pathway for navigating the interaction map to reach the initial interaction destination within the interaction map; and
initiating or continuing the interactive communication session with the communication system of the biller or merchant based using the one or more interaction destinations and the at least one user intent for the interactive communication session.

9. The method of claim 8, wherein the predetermined interaction coding further defines a plurality of conditional parameters for engaging with the communication system.

10. The method of claim 8, wherein initiating the interactive communication session comprises initiating a chatbot stored on a user device or a remote device.

11. The method of claim 10, further comprising:
generating at least one textual response or audio response based at least in part on the user intent and the aural request; and
communicating, using the chatbot, with the network entity of the biller or merchant using the at least one textual response or audio response.

12. The method of claim 11, further comprising:
retrieving, from a remote database, user account information associated with the biller or merchant; and
communicating with the network entity based at least in part on the user account information.

13. The method of claim 11, further comprising:
generating a user profile comprising user-specific preferences for the user; and
storing user information associated with the interactive communication session.

14. The method of claim 11, wherein the chatbot comprises a neural network machine learning model.

15. A computer program product comprising at least one non-transitory computer-readable storage medium comprising computer-executable program instructions stored thereon which, when executed by a processor, configure the processor to perform at least:
initiating, for a user, an interactive communication session with a communication system of a biller or merchant;
determining, based at least in part on an analysis of communications by the user with the communication system of the biller or merchant, at least one user intent associated with the interactive communication session;
retrieving an interaction map associated with the communication system of the biller or merchant;
determining, based on at least the interaction map and the at least one user intent, one or more interaction destinations within the interaction map, the one or more interaction destinations being associated with the at least one user intent for the interactive communication session with the communication system of the biller or merchant;
transmitting a connection request towards a network entity associated with the biller or merchant, the connection request comprising an indication of the one or more interaction destinations, the indication comprising at least one predetermined interaction coding associated with the one or more interaction destinations, the predetermined interaction coding comprising an initial interaction destination within the interaction map and an optimal pathway for navigating the interaction map to reach the initial interaction destination within the interaction map; and
initiating or continuing the interactive communication session with the communication system of the biller or merchant based using the one or more interaction destinations and the at least one user intent for the interactive communication session.

16. The computer program product of claim 15, wherein the predetermined interaction coding further defines a plurality of conditional parameters for engaging with the communication system.

17. The computer program product of claim 15, wherein initiating the interactive communication session comprises initiating a chatbot stored on a user device or a remote device.

18. The computer program product of claim 17, wherein the at least one non-transitory computer-readable storage medium further stores computer-executable program instructions which, when executed by the processor, configure the processor to perform at least:
    generating at least one textual response or audio response based at least in part on the user intent and the aural request; and
    communicating, using the chatbot, with the network entity of the biller or merchant using the at least one textual response or audio response.

19. The computer program product of claim 18, wherein the at least one non-transitory computer-readable storage medium further stores computer-executable program instructions which, when executed by the processor, configure the processor to perform at least:
    retrieving, from a remote database, user account information associated with the biller or merchant; and
    communicating with the network entity based at least in part on the user account information.

20. The computer program product of claim 18, wherein the at least one non-transitory computer-readable storage medium further stores computer-executable program instructions which, when executed by the processor, configure the processor to perform at least:
    generating a user profile comprising user-specific preferences for the user; and
    storing user information associated with the interactive communication session.

21. The computer program product of claim 18, wherein the chatbot comprises a neural network machine learning model.

* * * * *